United States Patent [19]
Blakeney, II et al.

[11] Patent Number: 5,640,414
[45] Date of Patent: Jun. 17, 1997

[54] MOBILE STATION ASSISTED SOFT HANDOFF IN A CDMA CELLULAR COMMUNICATIONS SYSTEM

[75] Inventors: Robert D. Blakeney, II; Gadi Karmi; Edward G. Tiedemann, Jr.; Lindsay A. Weaver, Jr., all of San Diego, Calif.

[73] Assignee: QUALCOMM Incorporated, San Diego, Calif.

[21] Appl. No.: 226,222

[22] Filed: Apr. 11, 1994

Related U.S. Application Data

[63] Continuation of Ser. No. 134,356, Oct. 8, 1993, abandoned, which is a continuation of Ser. No. 847,148, Mar. 5, 1992, Pat. No. 5,267,261.

[51] Int. Cl.$^6$ ............................................. H04K 1/10
[52] U.S. Cl. ............................ 375/200; 379/59; 379/60; 455/33; 455/34; 380/34
[58] Field of Search ......................... 375/1, 68; 379/60, 379/59; 455/33, 34, 56; 380/34; 370/18, 21, 22

[56] References Cited

U.S. PATENT DOCUMENTS

| | | | |
|---|---|---|---|
| 4,112,257 | 9/1978 | Frost | 179/2 |
| 4,222,115 | 9/1980 | Cooper et al. | 375/1 |
| 4,475,010 | 10/1984 | Huensch et al. | 179/2 |
| 4,672,658 | 6/1987 | Kavehrad et al. | 379/63 |
| 4,718,081 | 1/1988 | Brenig | 379/60 |
| 4,765,753 | 8/1988 | Schmidt | 379/60 |
| 5,054,110 | 10/1991 | Comroe et al. | 455/33 |
| 5,056,109 | 10/1991 | Gilhousen et al. | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,109,528 | 4/1992 | Uddenfeldt | 455/33.2 |
| 5,127,100 | 6/1992 | D'Amico | 455/33.1 |
| 5,164,958 | 11/1992 | Omura | 375/1 |
| 5,179,571 | 1/1993 | Schilling | 375/1 |
| 5,265,119 | 11/1993 | Gilhousen et al. | 375/1 |
| 5,267,262 | 11/1993 | Wheatley | 375/1 |
| 5,309,474 | 5/1994 | Gilhousen et al. | 375/1 |
| 5,327,577 | 7/1994 | Uddenfeldt | 455/33.2 |

*Primary Examiner*—David C. Cain
*Attorney, Agent, or Firm*—Russell B. Miller; Gregory D. Ogrod

[57] ABSTRACT

In a code division multiple access (CDMA) spread spectrum cellular communication system in which a mobile station user communicates with another system user via at least one base station, wherein each base station transmits a common pilot signal of a different code phase with respect to other base stations in said system, a method for directing communications between said mobile station user and said base stations. The mobile station monitors the signal strength of pilots and reports the measured signal strength to a system controller via the base station through which it is communicating. Command messages from the system controller to a new base station and the mobiles station establishes communication through the new base station in addition to the communication through the current base station. When the mobile station detects the falling below a predetermined level of the signal strength of a pilot corresponding to at least one of the base stations through which the mobile station is communicating, the mobile station reports the measured signal strength indicative of the corresponding base station to the system controller via the base stations through which it is communicating. Command messages from the system controller to the identified base station and the mobiles station terminates communication through the corresponding base station while communications through the other base station or base stations continue.

15 Claims, 8 Drawing Sheets

MOBILE STATION ASSISTED SOFT HANDOFF IN A CDMA CELLULAR COMMUNICATIONS SYSTEM

This is a continuation of Ser. No. 08/134,356 filed Oct. 8, 1993, now abandoned which is a continuation of application Ser. No. 07/847,148 filed Mar. 5, 1992 now issued as U.S. Pat. No. 5,267,261.

BACKGROUND OF THE INVENTION

I. Field of the Invention

The present application is a related to copending U.S. patent application Ser. No. 07/433,030, filed Nov. 7, 1989, entitled "METHOD AND SYSTEM FOR PROVIDING A SOFT HANDOFF IN COMMUNICATIONS IN A CDMA CELLULAR TELEPHONE SYSTEM" now U.S. Pat. NO. 5,101.501 and as such also relates cellular communications systems. More specifically, the present invention relates to a novel and improved system for controlling the handoff in communications of a mobile station between cell base stations or sectors thereof in a code division multiple access (CDMA) cellular communications system.

II. Description of the Related Art

The use of code division multiple access (CDMA) modulation techniques is but one of several techniques for facilitating communications in which a large number of system users are present. Although other techniques such as time division multiple access (TDMA), frequency division multiple access (FDMA) and AM modulation schemes such as amplitude companded single sideband (ACSSB) are known, CDMA has significant advantages over these other modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, the disclosure thereof incorporated by reference.

In the just mentioned patent, a multiple access technique is disclosed where a large number of mobile telephone system users, each having a transceiver, communicate through satellite repeaters or terrestrial base stations (also known as cell base stations, or cell-sites) using code division multiple access (CDMA) spread spectrum communication signals. In using CDMA communications, the frequency spectrum can be reused multiple times thus permitting an increase in system user capacity. The use of CDMA techniques results in a much higher spectral efficiency than can be achieved using other multiple access techniques.

In the conventional cellular telephone systems the available frequency band is divided into channels typically 30 KHz in bandwidth while analog FM modulation techniques are used. The system service area is divided geographically into cells of varying size. The available frequency channels are divided into sets with each set usually containing an equal number of channels. The frequency sets are assigned to cells in such a way as to minimize the possibility of co-channel interference. For example, consider a system in which there are seven frequency sets and the cells are equal size hexagons. A frequency set used in one cell will not be used in the six nearest or surrounding neighbors of that cell. Furthermore, the frequency set in one cell will not be used in the twelve next nearest neighbors of that cell.

In the conventional cellular telephone system, the handoff scheme implemented is intended to allow a call to continue when a mobile telephone crosses the boundary between two cells. The handoff from one cell to another is initiated when the receiver in the cell base station handling the call notices that the received signal strength from the mobile telephone falls below a predetermined threshold value. A low signal strength indication implies that the mobile telephone must be near the cell border. When the signal level fails below the predetermined threshold value, the base station asks the system controller to determine whether a neighboring base station receives the mobile telephone signal with better signal strength than the current base station.

The system controller in response to the current base station inquiry sends messages to the neighboring base stations with a handoff request. The base stations neighboring the current base station employ special scanning receivers which look for the signal from the mobile telephone on the specified channel. Should one of the neighboring base stations report an adequate signal level to the system controller, then a handoff will be attempted.

Handoff is then initiated when an idle channel from the channel set used in the new base station is selected. A control message is sent to the mobile telephone commanding it to switch from the current channel to the new channel. At the same time, the system controller switches the call from the first base station to the second base station.

In the conventional system a call will be discontinued if the handoff to the new base station is unsuccessful. There are many reasons that a failure in handoff may occur. Handoff can fail if there is no idle channel available in the neighboring cell for communicating the call. Handoff can also fail if another base station reports hearing the mobile telephone in question, when in fact this base station actually hears a different mobile telephone using the same channel in a completely different cell. This reporting error will result in the call being switched to a wrong cell, typically one in which signal strength is insufficient to maintain communications. Furthermore should the mobile telephone fail to hear the command to switch channels, the handoff will fail. Actual operating experience indicates that handoff failures occur frequently which questions the reliability of the system.

Another common problem in the conventional telephone system occurs when the mobile telephone is near the border between two cells. In this situation the signal level tends to fluctuate at both base stations. This signal level fluctuation results in a ping-ponging situation in which repeated requests are made to hand the call back and forth between the two base stations. Such additional unnecessary handoff requests increase the possibility of the mobile station incorrectly hearing the channel switch command or failing to hear the command at all. Furthermore, the ping-ponging situation raises the possibility that the call will be discontinued if it is inadvertently transferred to a cell in which all channels are currently in use and thus unavailable for accepting the handoff.

In the co-pending parent application a method and system are disclosed for providing a communication with the mobile station through more than one cell base stations during the handoff. In this environment communication between the mobile station and the other user is uninterrupted by the eventual handoff from the base station corresponding to cell from which the mobile station is exiting to the base station corresponding to cell from which the mobile station is entering. This type of handoff may be considered as a "soft" handoff in communications between cell base stations with the mobile wherein two or more base stations or sectors of a base station transmit concurrently to the mobile station. Similar are the techniques for a handoff between a sector of one cell and another cell, and a handoff between sectors of a same cell base station for a sectorized cell.

The present invention provides a substantial improvement over current cellular telephone systems with respect to mobile station handoff. The make-before-break handoff mechanism of the present invention is a significant improvement in overall system reliability with lower service disruption. The implementation of a base station diversity mode provides further improvements over conventional cellular telephone systems by providing additional system reliability and quality in communications.

It is therefore an object of the present invention to provide in a cellular communication system an improvement in call handoff in communications of a mobile station between base station so as to provide greater service reliability and quality.

SUMMARY OF THE INVENTION

The present invention provides a novel and improved method and system for directing a handoff in mobile station communication between base stations. The present invention is described herein in an exemplary embodiment as a cellular communication system which uses code division multiple access (CDMA) modulation techniques. In the system, each base station transmits a pilot signal of a common PN spreading code offset in code phase from pilot signals of other base stations. In system communications with the mobile station, the mobile station is provided with a list of PN offsets corresponding to base stations of neighboring cells. In addition the mobile is provided with a message which identifies at least one pilot corresponding to a base station to which the mobile station is to communicate through. These lists are stored at the mobile station as a Neighbor Set and an Active Set of pilots. These lists are updated as conditions change.

When communications are established with the mobile station through a base station, one which corresponds to the mobile station Active Set, the mobile station monitors the signal strength of identifiable pilot signals transmitted from the various base stations. When a pilot signal exceeds a predetermined threshold level in signal strength, the pilot is added to a Candidate Set at the mobile. The mobile communicates a message to the base station identifying this new pilot and its signal strength. A system controller then uses this information to decide whether to add this pilot to the mobile station Active Set. Should the system controller decide to do so, a message is transmitted to the mobile station through at least the base station which the mobile station is currently communicating through. This message identifies the pilots of the Active Set which correspond to base stations through which the mobile station is to communicate. The system controller also communicates information to each base station corresponding to a new pilot in the Active Set which instructs each of these base stations to establish communications with the mobile station. The mobile station communications are thus routed through all base stations identified by pilots in the mobile station Active Set.

When the mobile station is communicating through multiple base stations, the pilot signal strength of these base station along with other base stations is monitored by the mobile station. Should a pilot signal corresponding to a pilot of the Active Set drop below a predetermined threshold for a predetermined period of time, the mobile station generates and transmits a message to report the event. The system controller receives this message via at least one of the base stations through which the mobile station is communicating. The system controller may then decide to terminate communications through the base station whose pilot signal strength as measured at the mobile station is below the threshold level.

The system controller upon deciding to terminate communications through a base station generates a new message identifying the pilots of the Active Set to which the mobile station is to communicate through. In this message which identifies pilots of the Active Set, the pilot of the base station to which communications with the mobile station are to be terminated is not identified. The system controller also communicates information to the base station not identified in the Active Set to terminate communications with the mobile station. The mobile station, upon receiving the message identifying pilots of the Active Set, discontinues processing signals from the base station whose pilot is no longer in the Active Set. The mobile station communications are thus routed only through base stations identified by pilots in the mobile station Active Set. In the case where there were previously more than one pilot identified in the Active Set and now only one, the mobile station communicates only to the one base station corresponding to the pilot identified in the mobile station Active Set.

Since the mobile station is communicating with the user via at least one base station at all times throughout the handoff there is no interruption in communications between the mobile station and the user. A soft handoff in communications provides significant benefits in its inherent "make before break" communication over conventional "break before make" techniques employed in other cellular communication systems.

BRIEF DESCRIPTION OF THE DRAWINGS

The features and advantages of the present invention will become more apparent from the detailed description set forth below when taken in conjunction with the drawings in which like reference characters correspond throughout and wherein.

DETAILED DESCRIPTION OF THE PREFERRED EMBODIMENTS

Figure 1:
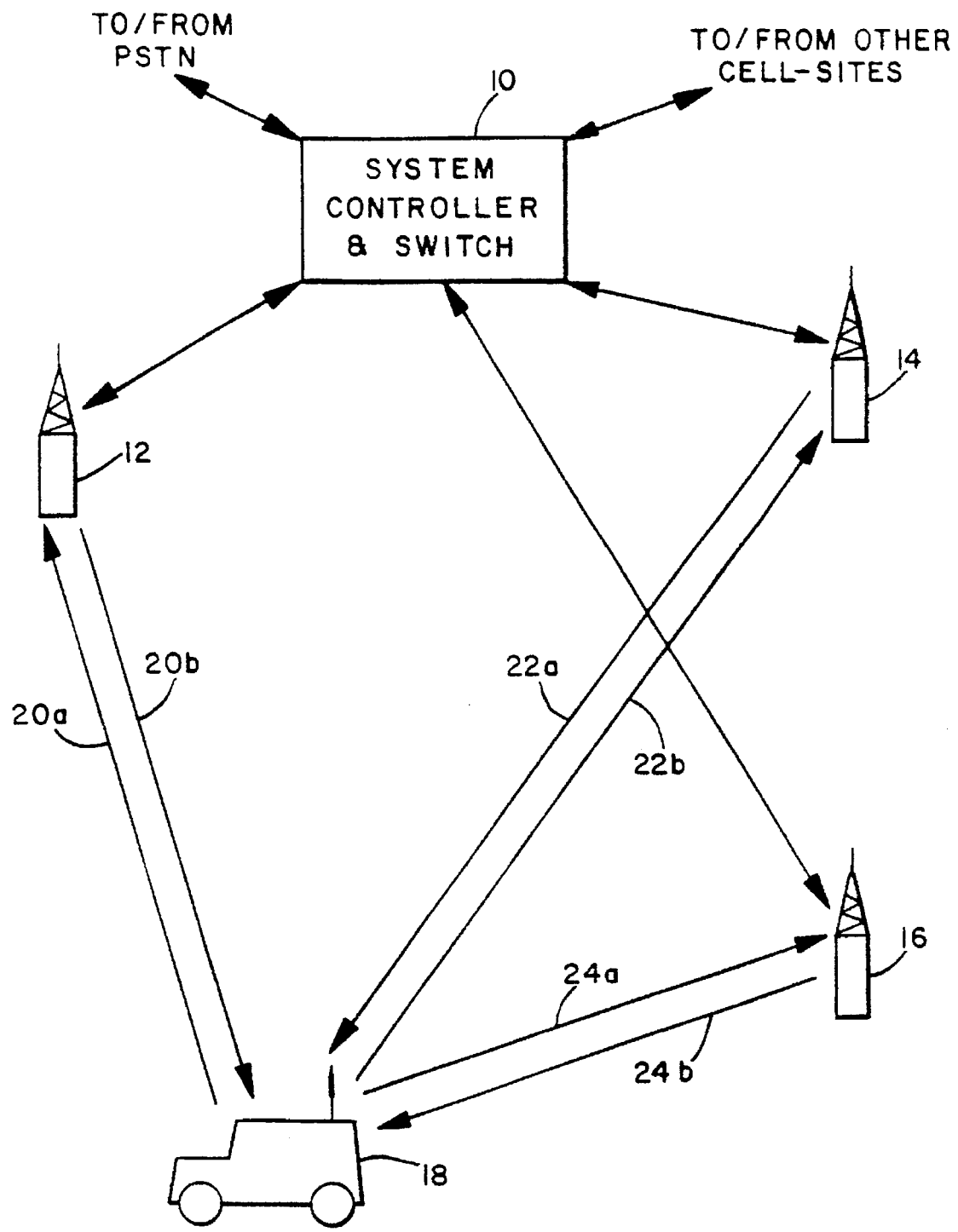
FIG. 1 is a schematic overview of an exemplary CDMA cellular telephone system in accordance with the present invention.

In a CDMA cellular communication system, the same frequency band can be used for all cells. The CDMA waveform properties that provide processing gain are also used to discriminate between signals that occupy the same frequency band. A mobile station, or for short mobile, such as a vehicle mounted telephone or portable telephone, or personal communications system (PCS) handset, thus need not switch frequencies when handoff of the call is made from one base station to another. Furthermore, the probability that the call will be discontinued if the handoff command is received in error is substantially reduced.

In a CDMA cellular communications system, each base station has a plurality of modulator-demodulator stations or spread spectrum modems. Each modem consists of a digital spread spectrum transmit modulator, at least one digital spread spectrum data receiver and a searcher receiver. Each modem at the base station is assigned to a mobile as needed to facilitate communications with the assigned mobile. Therefore in many instances many modems are available for use while other ones may be Active in communicating with respective mobiles.

In the present invention, a handoff scheme is employed for a CDMA cellular communications system, such as a CDMA cellular telephone, Private Branch Exchange, or PCS system, in which a new base station modem is assigned to a mobile while the old base station continues to service the call. When the mobile is located in the transition region between the two base stations, the call can be provided through the various base stations as signal strength dictates. Since the mobile is always communicating through at least one base station, no disrupting effects to the mobile station or in service will occur. It should be understood that many aspects of the handoff techniques disclosed herein are also applicable to handoffs between sectors in a sectorized cell.

When mobile station communications are firmly established with the new base station, e.g. the mobile is well within the new cell, the old base station discontinues servicing the call. The just described handoff techniques can be considered as a "soft" handoff in communications between base stations with the mobile. The soft handoff is in essence a make-before-break switching function. In contrast, conventional cellular telephone systems can be considered as providing a break-before-make switching function.

In a CDMA cellular communication system of the present invention, a soft handoff technique is implemented which also permits the mobile station to initiate a handoff. The mobile is also permitted to determine the best new base station to which communications are to be transferred to from an old base station or base station sector.

Although it is preferred that the mobile initiate the handoff request and determine the new base station, handoff process decisions may be made as in the conventional cellular telephone system. As discussed previously with respect to conventional systems, the base station determines when a handoff may be appropriate and, via the system controller, requests neighboring cells to search for the mobile's signal. The base station receiving the strongest signal as determined by the system controller then accepts the handoff.

In the CDMA cellular communication system, each base station transmits a upon pilot channel a "pilot carrier" signal or, for short, pilot signal. The pilot signal is an unmodulated, direct sequence, spread spectrum signal transmitted at all times by each base station using a common pseudorandom noise (PN) spreading code. The pilot signal allows the mobile stations to obtain initial system synchronization, i.e. timing, in addition to providing a phase reference for coherent demodulation and a reference for signal strength for comparisons between base stations for handoff determination.

The pilot signal as transmitted by each base station is of the same PN spreading code but with a different code phase offset. For example, in the present invention the pilot signal spreading code is of a PN code length of $2^{15}$. In this example there are 511 different offsets from the zero offset, where the offsets are in increments of 64 PN chips. It is this phase offset which allows the pilot signals to be distinguished from one another by the mobile station, resulting in a differentiation between base stations from which they originate. Use of the same pilot signal code allows the mobile station to find system timing synchronization by a single search through all pilot signal code phases. The strongest pilot signal, as determined by a correlation process for each code phase, is readily identifiable. The identified pilot signal generally corresponds to the pilot signal transmitted by the nearest base station.

Each base station also transmits a sync channel signal which is a modulated, encoded, interleaved, direct sequence, spread spectrum signal used by the mobile stations to acquire additional synchronization, system time and, along with these, other overhead control information. Information such as system identification, network identification, a pilot PN sequence offset index, a long code state, current system time along with other time parameters, and paging channel data rate are transmitted on the sync channel. It should be noted that the pilot PN sequence offset index identifies an offset value from a zero offset pilot PN sequence. The sync channel signal is despread using the same pilot PN sequence offset as the pilot channel.

Each base station also transmits on one or more paging channels corresponding paging channel signals. The paging channel signals are modulated, interleaved, scrambled, direct sequence, spread spectrum signals, which contain control and overhead information. The paging channel is used as such to communicate global and mobile station specific orders, including pages. Overhead messages transmitted on the paging channel include a system parameters message, which contains general system and base station overhead information; an access parameters message, which contains information to be used by the mobile station on an access channel when accessing the system; a neighbors list message which identifies to the mobile station the pilot signal PN sequence offset of the neighboring base stations; and a CDMA channel list identifying the 1.25 MHz CDMA channels available in this base station. The sync channel transmitted long code state message is used by the mobile station to descramble the paging channel scrambled signal. Like the sync channel signals, the paging channel signals spread and despread using the same pilot PN sequence offset as the pilot channel.

Each base station transmits user information to an intended mobile station on a selected one of a plurality of traffic channels. Each mobile station is thus assigned to a unique traffic channel for receiving the mobile station intended information. The traffic channel signals are modulated, interleaved, scrambled, direct sequence, spread spectrum signals transmitted to mobile stations on a respective traffic channel. Information received in the sync channel message is used by the mobile station to descramble the traffic channel scrambled signal.

Further details on the modulation scheme for the various channels of the base station are described in a co-pending U.S. patent application entitled "SYSTEM AND METHOD FOR GENERATING SIGNAL WAVEFORMS IN A CDMA CELLULAR TELEPHONE SYSTEM", Ser. No. 07/543, 496, filed Jun. 25, 1990, now U.S. Pat. No. 5,104,459 assigned to the assignee of the present invention, the disclosure thereof incorporated by reference.

An exemplary illustration of cellular telephone, which may as easily be shown as a PBX or PCS system, in which the present invention is embodied is provided in FIG. 1. The system illustrated in FIG. 1 utilizes CDMA modulation techniques in communication between the system mobile stations or mobile telephones, and the base stations. Cellular systems in large cities may have hundreds of base stations serving hundreds of thousands of mobile telephones. The use of CDMA techniques readily facilitates increases in user capacity in systems of this size as compared to conventional FM modulation cellular systems.

In FIG. 1, system controller and switch 10, also referred to as mobile telephone switching office (MTSO), typically includes interface and processing circuitry for providing system control to the base stations. Controller 10 also controls the routing of telephone calls from the public switched telephone network (PSTN) to the appropriate base station for transmission to the appropriate mobile station. Controller 10 also controls the routing of calls from the mobile stations, via at least one base station to the PSTN. Controller 10 may direct calls between mobile users via the appropriate base station(s) since such mobile stations do not typically communicate directly with one another.

Controller 10 may be coupled to the base stations by various means such as dedicated telephone lines, optical fiber links or by microwave communication links. In FIG. 1, three such exemplary base stations, 12, 14 and 16 along with an exemplary mobile station 18, which includes a cellular telephone, are illustrated. Arrows 20a–20b define the possible communication link between base station 12 and mobile station 18. Arrows 22a–22b define the possible communication link between base station 14 and mobile station 18. Similarly, arrows 24a–24b define the possible communication link between base station 16 and mobile station 18.

The base station service areas or cells are designed in geographic shapes such that the mobile station will normally be closest to one base station. When the mobile station is idle, i.e., no calls in progress, the mobile station constantly monitors the pilot signal transmissions from each nearby base station. As illustrated in FIG. 1 the pilot signals are respectively transmitted to mobile station 18 by base stations 12, 14 and 16 respectively upon communication links 20b, 22b and 24b. The mobile station then determines which cell it is in by comparing pilot signal strength transmitted from these particular base stations.

In the example illustrated in FIG. 1, mobile station 18 may be considered closest to base station 16. When mobile station 18 initiates a call, a control message is transmitted to the nearest base station, base station 16. Base station 16 upon receiving the call request message, signals system controller 10 and transfers the call number. System controller 10 then connects the call through the PSTN to the intended recipient.

Should a call be initiated within the PSTN, controller 10 transmits the call information to all the base stations in the area. The base stations in return transmit a paging message to the intended recipient of mobile station. When the mobile station hears a page message, it responds with a control message that is transmitted to the nearest base station. This control message signals the system controller that this particular base station is in communication with the mobile station. Controller 10 then routes the call through this base station to the mobile station.

Should mobile station 18 move out of the coverage area of the initial base station, base station 16, an attempt is made to continue the call by routing the call through another base station. In the handoff process there are two different methods of initiating the handoff of the call or routing through another base station.

The first method, called the base station initiated handoff, is similar to the handoff method employed in the original first generation analog cellular telephone systems currently in use. In the base station initiated handoff method, the initial base station, base station 16, notices that the signal transmitted by mobile station 18 has fallen below a certain threshold level. Base station 16 then transmits a handoff request to system controller 10. Controller 10 relays the request to all neighboring base stations, 14, 12 of base station 16. The controller transmitted request includes information relating to the channel, including the PN code sequence used by mobile station 18. Base stations 12 and 14 tune a receiver to the channel being used by the mobile station and measure the signal strength, typically using digital techniques. If one of base stations 12 and 14 receivers report a stronger signal than the initial base station reported signal strength, then a handoff is made to this base station.

The second method of initiating a handoff is called the mobile initiated handoff. The mobile station is equipped with a search receiver which is used to scan the pilot signal transmission of neighboring base stations 12 and 14, in addition to performing other functions. If a pilot signal of base stations 12 and 14 is found to be stronger than a predetermined threshold, mobile station 18 transmits a message to the current base station, base station 16. An interactive process between the mobile station and the base station then permits the mobile station to communicate through the one or more of base stations 12, 14 and 16.

The mobile initiated handoff method has various advantages over the base station initiated handoff method. The mobile station becomes aware of changes in paths between itself and the various neighboring base stations much sooner than the base stations are capable of doing. However, to perform a mobile initiated handoff, each mobile station must be provided with a searching receiver to perform the scan function. However, in the exemplary embodiment described herein of a mobile station CDMA communications capability, the search receiver has additional functions which require its presence.

The mobile initiated handoff relies on the mobile station to detect the presence or absence of pilot signals, and the signal strength of the pilot signals. The mobile station identifies and measures the signal strength of the pilot signals which it receives. This information is communicated via the base station(s) to which the mobile station is communicating through to the MTSO. The MTSO upon receiving this information initiates or tears down the soft handoffs. To streamline the process of searching for pilots, four distinct sets of pilot offsets are defined: the Active Set, the Candidate Set, the Neighbor Set, and the Remaining Set. The Active Set identifies the base station(s) or sector(s) through which the mobile station is communicating. The Candidate Set identifies the base station(s) or sector(s) for which the pilots have been received at the mobile station with sufficient signal strength to make them members of the Active Set, but have not been placed in the Active Set by the base station(s). The Neighbor Set identifies the base station (s) or sector(s) which are likely candidates for the establishment of communication with the mobile station. The Remaining Set identifies the base station(s) or sector(s) having all other possible pilot offsets in the current system, excluding those pilot offsets currently in the Active, the Candidate and Neighbor sets. Further details on the use of these sets in the handoff scheme are discussed later in further detail.

At the mobile station acquisition of the strongest pilot signal, i.e. initial synchronization of the mobile station with the strongest pilot signal, the mobile station obtains further overhead information on the sync channel of same base station. The mobile station then monitors the paging channel for control messages and call pages. The call page is typically used to notify the mobile station that a call is waiting for transfer to the mobile station.

The mobile station continues to scan the received pilot carrier signal code at the PN sequence offsets corresponding to neighboring base station transmitted pilot signals. This scanning is done in order to determine if the pilot signal transmitted from neighboring cells is becoming stronger than the pilot signal first determined to be strongest. If, while in this call inactive mode, a Neighbor base station pilot signal becomes sufficiently stronger than that of the initial base station transmitted pilot signal, the mobile station will acquire the stronger pilot signal and corresponding sync channel of the new base station.

When a call is initiated, a pseudorandom noise (PN) code address is determined for use during the course of this call. Generally this code address is used to mask the PN long sequence code in a the code unique the code unique to the communication between the base station and the mobile station. The code address may be either assigned by the base station or preferably be determined by prearrangement based upon the identity of the mobile station.

After a call is initiated the mobile station continues to scan the pilot signals transmitted by base stations located in neighboring cells. Pilot signal scanning continues in order to determine if one or more of the neighboring base station transmitted pilot signals rises above a predetermined threshold, a level which is indicative that communications may be supported between the base station and the mobile station. When the pilot signal transmitted by a base station located in a neighboring cell rises above the threshold, it serves as an indication to the mobile station that a handoff should be initiated. In response to this pilot signal strength determination, the mobile station generates and transmits a control message to the base station presently servicing the call. This control message is relayed on to the system controller.

The system controller now begins the handoff process. It should be understood that, during handoff, the PN code address of the particular mobile station which is to undergo the handoff process need not change. The system controller begins the handoff by assigning a modem located in the new base station to the call. This modem is given the PN address associated with the call in communications between the mobile station and the current base station modem. The new base station modem assigned to service the call searches for and finds the mobile station transmitted signal. The base station modem also begins transmitting outbound signals to the mobile station. In response to a message from the base station through which the mobile station is currently communicating, the mobile station searches for the outbound signals in accordance with the pilot signal information of the new base station.

When the new base station modem transmitted signal is acquired, the mobile station switches over to listening to this signal. The mobile station may then transmit a control message indicating that handoff is complete. The control message is provided by either or both of the old and new base station modems to the system controller. In response to this control message the system controller switches the call over to the new base station modem alone while discontinuing the call through the old base station modem. The old base station modem then enters a pool of idle modems available for reassignment.

As an additional improvement, the handoff process can introduce a second mode of operation. This second mode is referred to herein as the base station diversity mode. The subject matter on the base station diversity mode is further disclosed in a copending U.S. patent application entitled "DIVERSITY RECEIVER IN A CDMA CELLULAR TELEPHONE SYSTEM", Ser. No. 07/432,552, filed Nov. 7, 1989, assigned to the assignee of the present invention, the disclosure thereof incorporated by reference.

In the base station diversity mode the call is allowed to linger in the in-between state as described above with reference to the call being processed by two or more base stations and/or by two or more sectors of the same base station. In the exemplary embodiment described herein with reference to the mobile telephone of the present invention, multiple demodulator processors or receivers are utilized. One of the receivers is used for the scanning function, while the two or more other receivers are used as a channel diversity receiver. During operation in a single cell, the scanning receiver attempts to find the base station transmitted signal travelling upon multiple paths to the mobile station. These multi-path signals are typically caused by reflections of the signals from terrain buildings, and other signals obstructions. When two or more such reflections are found, the two receivers are assigned to the two strongest paths. The scanning receiver continues to evaluate the multiple paths to keep the receivers synchronized with signals on the strongest paths as path conditions change.

In the base station diversity mode, the strongest paths from each base station is determined by the search receiver. The other receivers are assigned to demodulate the signals on the strongest paths of the paths available from the original base station and from the new base station. The data demodulation process uses information from both of these receivers in a diversity combining operation. The result of this diversity combining operation is a greatly improved resistance to deleterious fading that may occur in the multipath cellular telephone environment.

Although different types of diversity combining techniques are known in the art, the present invention uses diversity combining to significantly advance the quality and reliability of communications in a mobile cellular telephone system. In the present invention a form of maximal ratio combining is utilized. The signal-to-noise ratio is determined for both paths being combined with the contributions from the two paths weighted accordingly. Combining is coherent since pilot signal demodulation allows the phase of each path to be determined.

In the direction from the mobile station to the multiple base stations, path diversity reception is also obtained by having all base stations demodulate the mobile station transmitted signals. Each base station coherently combines the demodulated data signals and provides the data signal to the system controller. Each base station may also generate a quality indicator that is indicative of the quality of the data signal of that bases station. Communicated along with the data signal from each base station may be the signal quality indicator. The system controller then may either combines the base station versions of the mobile station signal or selects the signal with the best quality indication for providing on to the user. It should be understood that it is possible to transmit the undecoded or even the undemodulated signals to the system controller in order to allow a better diversity combining process to be utilized.

The handoff process in the cell diversity mode is initiated as previously discussed. The mobile station determines that a neighboring base station transmitted signal is of a signal strength great enough to allow good quality demodulation of the signal. The mobile station transmits the measurement message to the current base station. The base station then relays this information on to the system controller.

The system controller responds by connecting the call to a modem in the new base station. The system controller then performs either a diversity combining of the signals as received by the two base stations or a selection process as discussed above. The mobile station performs diversity combining of the signals received from the two base stations. The cell diversity mode generally continues for as long as signals received from both base stations are of a level sufficient to permit good quality demodulation, or otherwise terminated by the system controller.

In either of the above situations the mobile station continues to search for signals transmitted from other base stations. If a third base station transmitted signal becomes stronger than one of the original two base station signals, the message is then transmitted by the mobile station via at least one current base station to the system controller. The system controller may then discontinue the call being communicated via the weakest base station signal of the three while providing the call through the two strongest base stations. Should the mobile stations be equipped with additional receivers, such as three receivers, a triple base station or sector diversity mode may be implemented.

It should also be understood that regardless of the number of receivers the mobile station has, reverse link diversity may be employed. In this case additional base stations may receive signals from the mobile station for transfer to the system controller. The additional base stations may or may not transmit signals to the mobile station which are transmitted are not processed.

The base station diversity mode is terminated when it is determined that only one base station is providing adequate signals for quality demodulation. The mobile station, as before, sends a message indicative of the measured pilot signal strengths. From this information a decision is made as to the base station which is to remain in communication with the mobile station upon termination of the base station diversity mode. The base station diversity mode may also be terminated by the system controller if the system were to become overloaded with an insufficient number of modems available to support all mobile station requests for this mode of operation.

Figure 2:
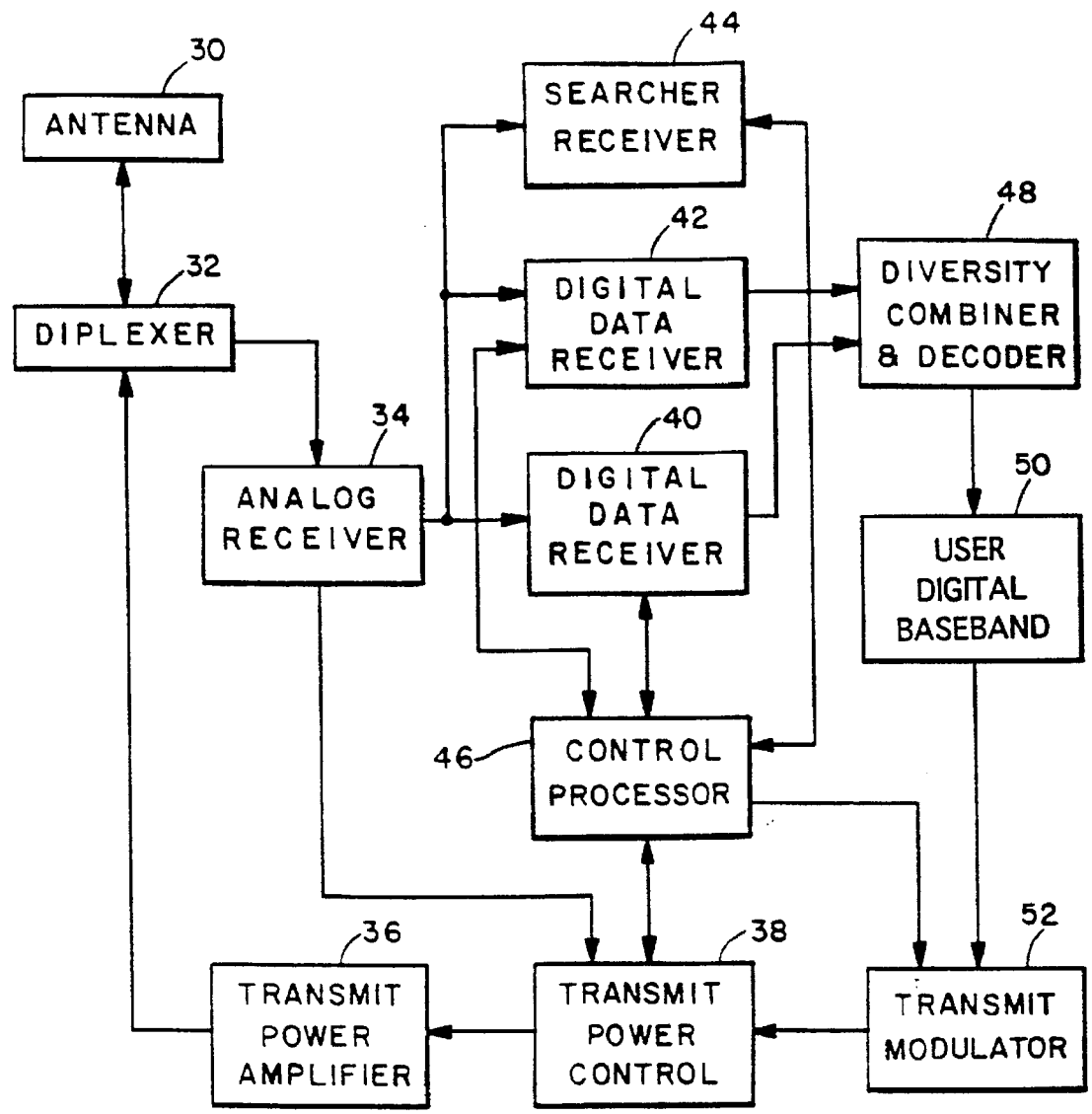
FIG. 2 is a block diagram of a mobile station telephone configured for CDMA communications in a CDMA cellular telephone system.

FIG. 2 illustrates in block diagram form an exemplary mobile station cellular telephone. The mobile station includes an antenna 30 which is coupled through diplexer 32 to analog receiver 34 and transmit power amplifier 36. Antenna 30 and diplexer 32 are of standard design and permit simultaneous transmission and reception through a single antenna. Antenna 30 collects transmitted signals and provides them through diplexer 32 to analog receiver 34. Receiver 34 receives the RF frequency signals from diplexer 32 which are typically in the 850 MHz frequency band for amplification and frequency downconversion to an IF frequency. This frequency translation process is accomplished using a frequency synthesizer of standard design which permits the receiver to be tuned to any of the frequencies within the receive frequency band of the overall cellular telephone frequency band.

The IF signal is then passed through a surface acoustic wave (SAW) bandpass filter which in the preferred embodiment is approximately 1.25 MHz in bandwidth. The characteristics of the SAW filter are chosen to match the waveform of the signal transmitted by the base station which has been direct sequence spread spectrum modulated by a PN sequence clocked at a predetermined rate, which in the preferred embodiment is 1.2288 MHz.

Receiver 34 also performs a power control function for adjusting the transmit power of the mobile station. Receiver 34 generates an analog power control signal that is provided to transmit power control circuitry 38. The control and operation of the mobile station power control feature is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM", assigned to the assignee of the present invention, to which the disclosure is also incorporated by reference.

Receiver 34 is also provided with an analog to digital (A/D) converter (not shown) for converting the IF signal to a digital signal. The digitized signal is provided to each of three or more signal processors or data receivers, one of which is a searcher receiver with the remainder being data receivers. For purposes of illustration only one searcher receiver and two data receives are shown in FIG. 2.

In FIG. 2, the digitized signal output from receiver 34 is provided to digital data receivers 40 and 42 and to searcher receiver 44. It should be understood that an inexpensive, low performance mobile station might have only a single data receiver while higher performance stations may have two or more, preferably a minimum of three, to allow diversity reception.

The digitized IF signal may contain the signals of many on-going calls together with the pilot carriers transmitted by the current and all neighboring base stations. The function of the receivers 40 and 42 is to correlate the IF samples with the proper PN sequence. This correlation process provides a property that is well-known in the art as "processing gain" which enhances the signal-to-interference ratio of a signal matching the proper PN sequence while not enhancing other signals. The correlation output is then coherently detected using the pilot carrier offset PN sequence used for the correlation as a carrier phase reference. The result of this detection process is a sequence of encoded data symbols.

A property of the PN sequence as used in the present invention is that discrimination is provided against multipath signals. When the signal arrives at the mobile receiver after passing through more than one path, there will be a difference in the reception time of the signal. This reception time difference corresponds to the difference in distance divided by the speed of light. If this time difference exceeds one PN chip, 0.8138 μsec. in the preferred embodiment, then the correlation process will discriminate against one of the paths. The receiver can choose whether to track and receive the earlier or later path. If two receivers are provided, such as receivers 40 and 42, then two independent paths can be tracked simultaneously.

Searcher receiver 44, under control of control processor 46 is for continuously scanning the time domain, around the nominal time of a received pilot signal of the base station, for other multi-path pilot signals from the same base station and for other base station transmitted pilot signals. Receiver 44 will measure the strength of any reception of a desired waveform at times other than the nominal time. Receiver 44 uses the ratio of the received pilot energy per chip to total received spectral density, noise and signals, denoted as $E_c/I_o$, as a measure of the pilot signal strength. Receiver 44 provides a signal strength measurement signal to control processor 46 indicative of the pilot signal and its signal strength.

Processor 46 provides signals to digital data receivers 40 and 42 for each to process a different one of the strongest signals. Receivers 40 and 42 may process a multipath signal from a single base station or signals from two different base stations.

The outputs of receivers 40 and 42 are provided to diversity combiner and decoder circuitry 48. The diversity combiner circuitry contained within circuitry 48 adjusts the timing of the two streams of received signals into alignment and adds them together. This addition process may be proceeded by multiplying the two streams by a number corresponding to the relative signal strengths of the two streams. This operation can be considered a maximal ratio diversity combiner. The resulting combined signal stream is then decoded using a forward stream error detection decoder also contained within circuitry 48.

In the exemplary embodiment convolutional encoding is utilized. The optimum decoder for this type of code is of the soft decision Viterbi algorithm decoder design. The resulting decoded information bits are passed to the user digital baseband circuitry 50.

Baseband circuitry 50 typically includes a digital vocoder (not shown). Baseband circuitry 50 further serves as an interface with a handset or any other type of peripheral device. Baseband circuitry 50 accommodates a variety of different vocoder designs. Baseband circuitry 50 provides output information signals to the user in accordance with the information provided thereto from circuitry 48. It should be understood that various other types of service, other than voice, may also be offered to which the disclosure herein is equally applicable.

User analog voice signals typically provided through a handset are provided as an input to baseband circuitry 50. Baseband circuitry 50 includes an analog to digital (A/D) converter (not shown) which converts the analog signal to digital form. The digital signal is provided to the digital vocoder where it is encoded. The vocoder output is provided to a forward error correction encoding circuit (not shown) for error correction. This voice digitized encoded signal is output from baseband circuitry 50 to transmit modulator 52.

Transmit modulator 52 modulates the encoded signal on a PN carrier signal whose PN sequence is chosen according to the assigned address function for the call. The PN sequence is determined by control processor 46 from call setup information that is transmitted by the base station and decoded receivers 40 and 42. In the alternative, control processor 46 may determine the PN sequence through prearrangement with the base station. Control processor 46 provides the PN sequence information to transmit modulator 52 and to receivers 40 and 42 for call decoding. Transmit modulator 52 also modulates the data with a common unshifted version of the PN code that is used by the base station.

The output of transmit modulator 52 is provided to transmit power control circuitry 38. Signal transmission power is controlled by the analog power control signal provided from receiver 34. Furthermore, control bits are transmitted by the base stations in the form power adjustment command and are processed by data receivers 40 and 42. The power adjustment command is used by the control processor in setting the power level in mobile station transmission. In response to the power adjustment commands, control processor 46 generates a digital power control signal that is provided to circuitry 38. Further information on the interrelationship of the receivers 40 and 42, control processor 46 and transmit power control 38 are also further described in the above-mentioned copending patent application.

Transmit power control circuitry 38 outputs the power controlled modulated signal to transmit power amplifier circuitry 36. Circuitry 36 amplifies and converts the IF signal to an RF frequency by mixing with a frequency synthesizer output signal which tunes the signal to the proper output frequency. Circuitry 36 includes an amplifier which amplifies the power to a final output level. The intended transmission signal is output from circuitry 36 to diplexer 32. Diplexer 32 couples the signal to antenna 30 for transmission to the base stations.

Control processor 46 is also capable of generating control messages such as cell-diversity mode requests and base station communication termination commands. These commands are provided to transmit modulator 52 for transmission. Control processor 46 is responsive to the data received from data receivers 40, 42 and search receiver 44 for making decisions relative to handoff and diversity combining.

Figure 3:
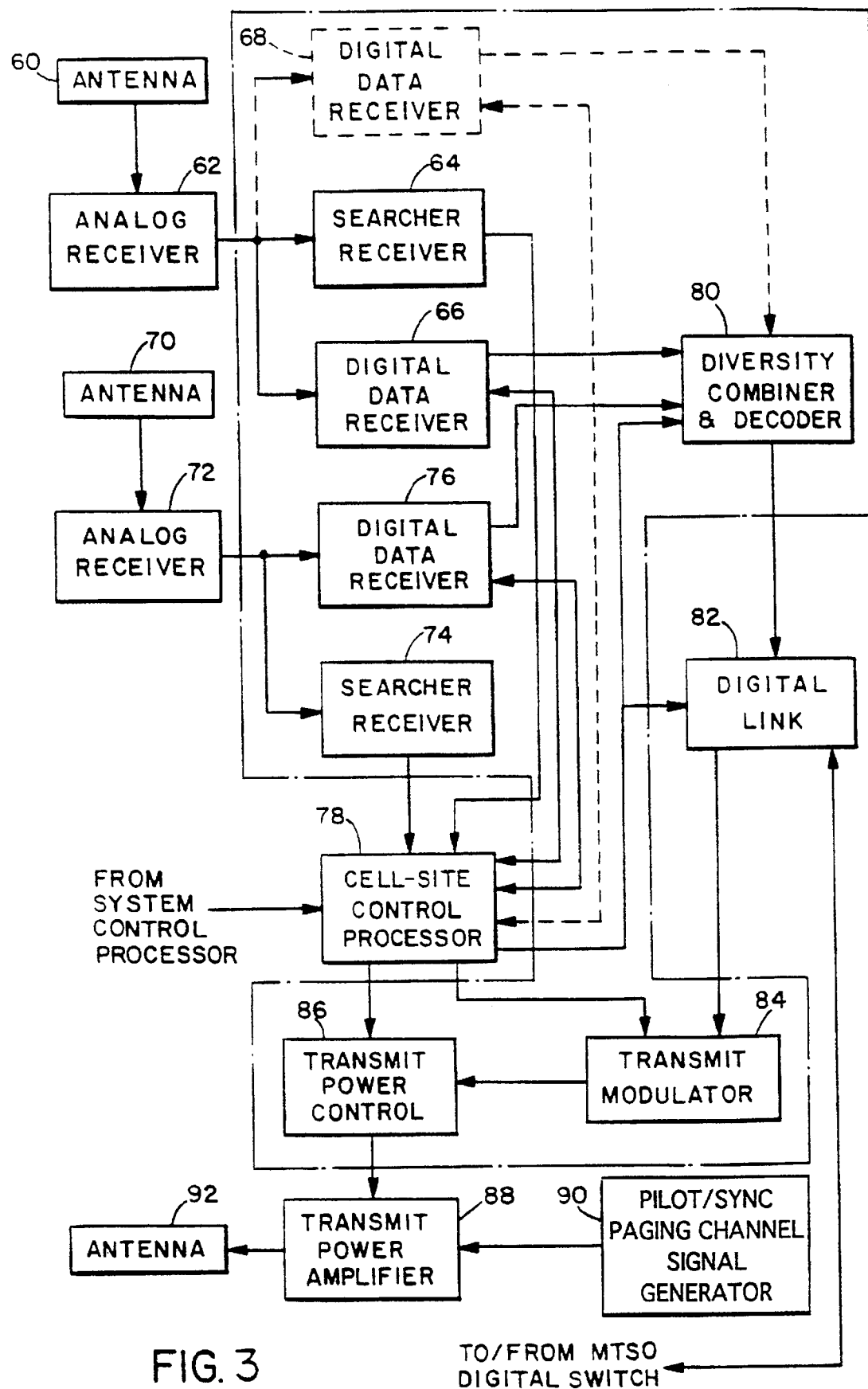
FIG. 3 is a block diagram of a base station equipment in a CDMA cellular telephone system.

FIG. 3 illustrates in block diagram form an exemplary embodiment of the base station equipment. At the base station, two receiver systems are utilized with each having a separate antenna and analog receiver for space diversity reception. In each of the receiver systems the signals are processed identically until the signals undergo a diversity combination process. The elements within the dashed lines correspond to elements corresponding to the communications between the base station and one mobile station. The output of the analog receivers are also provided to other elements used in communications with other mobile stations.

In FIG. 3, the first receiver system is comprised of antenna 60, analog receiver 62, searcher receiver 64 and digital data receiver 66. This receiver system may also include an optional digital data receiver 68. Although only one optional digital data receiver 68 is illustrated it should be understood that several additional ones may be used. The second receiver system includes antenna 70, analog receiver 72, searcher receiver 74 and digital data receiver 76. Again additional optional digital data receivers (not shown) may be utilized for this receiver system. Also utilized in signal processing and control for handoff and diversity is base station control processor 78. Both receiver systems are coupled to diversity combiner and decoder circuitry 80. Digital link 82 is utilized to communicate signals to and from the MTSO (FIG. 4) with base station transmit modulator 84 and circuitry 80 under the control of control processor 78.

Signals received on antenna 60 are provided to analog receiver 62. Received signals amplified by an amplifier in receiver 62 are translated to an IF frequency by mixing with a frequency synthesizer output signal. The IF signals are bandpass filtered and digitized in a process identical to that described with reference to the mobile station analog receiver. The digitized IF signals are provided to digital data receiver 66, optional data receiver 68 and searcher receiver 64 and are processed respectively in a manner similar to that as disclosed with reference to the digital data receivers and searcher receiver of the mobile station in FIG. 2. However, the processing by the digital data receivers and searcher receivers are different for the mobile to base station link from that used in the base station to mobile link in several respects.

In the inbound, or mobile station to base station link, the mobile station does not transmit a pilot signal that can be used for coherent reference purposes in signal processing at the base station. Thus, the mobile station to base station link utilizes a non-coherent modulation and demodulation scheme using 64-ary orthogonal signaling.

Searcher receiver 64 is again used to scan the time domain about the receiver signal to ensure that the associated digital data receiver 66, and data receiver 68 if used, are tracking and processing the strongest available time domain signals. This tracking process is identical to that described with reference to the mobile station. Searcher receiver 64 provides a signal to base station control processor 78 which provides control signals to digital data receivers 66 and 68 for selecting the appropriate received signals for processing.

In the 64-ary orthogonal signaling process, the mobile station transmitted symbol has one of 64 different possibilities. A 6 bit symbol is encoded into one of $2^6$, i.e. 64, different binary sequences. The set of sequences chosen are known as Walsh functions. The optimum receive function for the Walsh function is the Fast Hadamard Transform (FHT). In searcher receiver 64 and digital data receivers 66 and 68, the input signal is correlated as discussed with reference to the mobile station receivers, with the correlator output fed to a FHT processor. The FHT processor produces a set of 64 coefficients for every 6 symbols. The 64 symbols are then multiplied by a weighting function generated in the receiver. The weighting function is linked to measured signal strength. The weighted data is then provided as an output to diversity combiner and decoder circuitry 80.

The second receiver system processes the received signals in a manner similar to that discussed with respect to the first receiver system of FIG. 3. The weighted 64 symbols output from receivers 66 and 76 are provided to diversity combiner and decoder circuitry 80. Circuitry 80 includes an adder which adds the weighted 64 symbols from receiver 66 to the weighted 64 symbols from receiver 76. The resulting 64 coefficients are compared with one another in order to determine the largest coefficient. The magnitude of the comparison result, together with the identity or the largest of the 64 coefficients, is used to determine a set of decoder weights and symbols for use within a Viterbi algorithm decoder implemented in circuitry 80.

The Viterbi decoder is utilized to determine the most likely information bit sequence. For each vocoder data block, nominally 20 msec. of data, a signal quality estimate is obtained and transmitted as a mobile station power adjustment command along with data to the mobile station. Further information on the generation of this quality estimate is discussed in further detail in the co-pending application mentioned above. This quality estimate is the average signal-to-noise ratio over the 20 msec interval.

In FIG. 3, optional digital data receiver 68 may be included for improved performance of the system. This additional data receiver alone or in combination with additional receivers can track and receive other possible delay paths of mobile station transmitted signals. The structure and operation in this receiver is similar to that described with reference to the digital data receivers 66 and 76. Receiver 68 is utilized to obtain additional diversity modes. Optional additional digital data receivers providing additional diversity modes are extremely useful in those base stations which are located in dense urban areas where many possibilities for multipath signals occur.

Signals from the MTSO are coupled to the appropriate transmit modulator via digital link 82 under the control of control processor 78. Transmit modulator 84 spread spectrum modulates, according to a predetermined spreading function (PN code) as assigned by control processor 78, the data for transmission to the intended recipient mobile station. The output of transmit modulator 84 is provided to transmit power control circuitry 86 where under the control of control processor 78 the transmission power may be controlled. The output of circuitry 86 is provided to transmit power amplifier circuitry 88.

In the preferred implementation, each of a traffic channel (user data communication channel), sync channel, one or more paging channels, and pilot channel are modulated by a different Walsh function sequence. Although only the traffic channels are modulated with each unique PN code, each traffic channel along with the other channels are modulated by a common PN sequence. In the exemplary implementation the pilot channel Walsh function sequence is the "all zero" sequence thus resulting the pilot signal being the common PN sequence itself. All signals as modulated by the common PN sequence are provided to transmit power amplifier circuitry 88.

Circuitry 88 includes a summer for summing the output of transmit modulator 84 with the output of other transmit modulators at the base station. Circuitry 88 further includes a summer for summing the pilot signal/sync channel signal/paging channel signal output from generator 90 with the summed transmit modulator output signals. Circuitry 88 also includes a digital to analog converter, frequency upconversion circuitry and an amplifier for respectively converting the digital signals to analog signals, converting the IF frequency signals as output from the transmit modulators to an RF frequency and amplifying the RF signal. The output from circuitry 88 is provided to antenna 92 where it is radiated to mobile stations within the base station service area.

Base station control processor 78 has the responsibility for assignment of digital data receivers and modulators to a particular call. Control processor 78 also monitors the progress of the call, quality of the signals and initiates teardown on loss of signal. The base station communicates with the MTSO via link 82 where it is coupled by a standard telephone wire, optical fiber, or microwave link.

Figure 4:
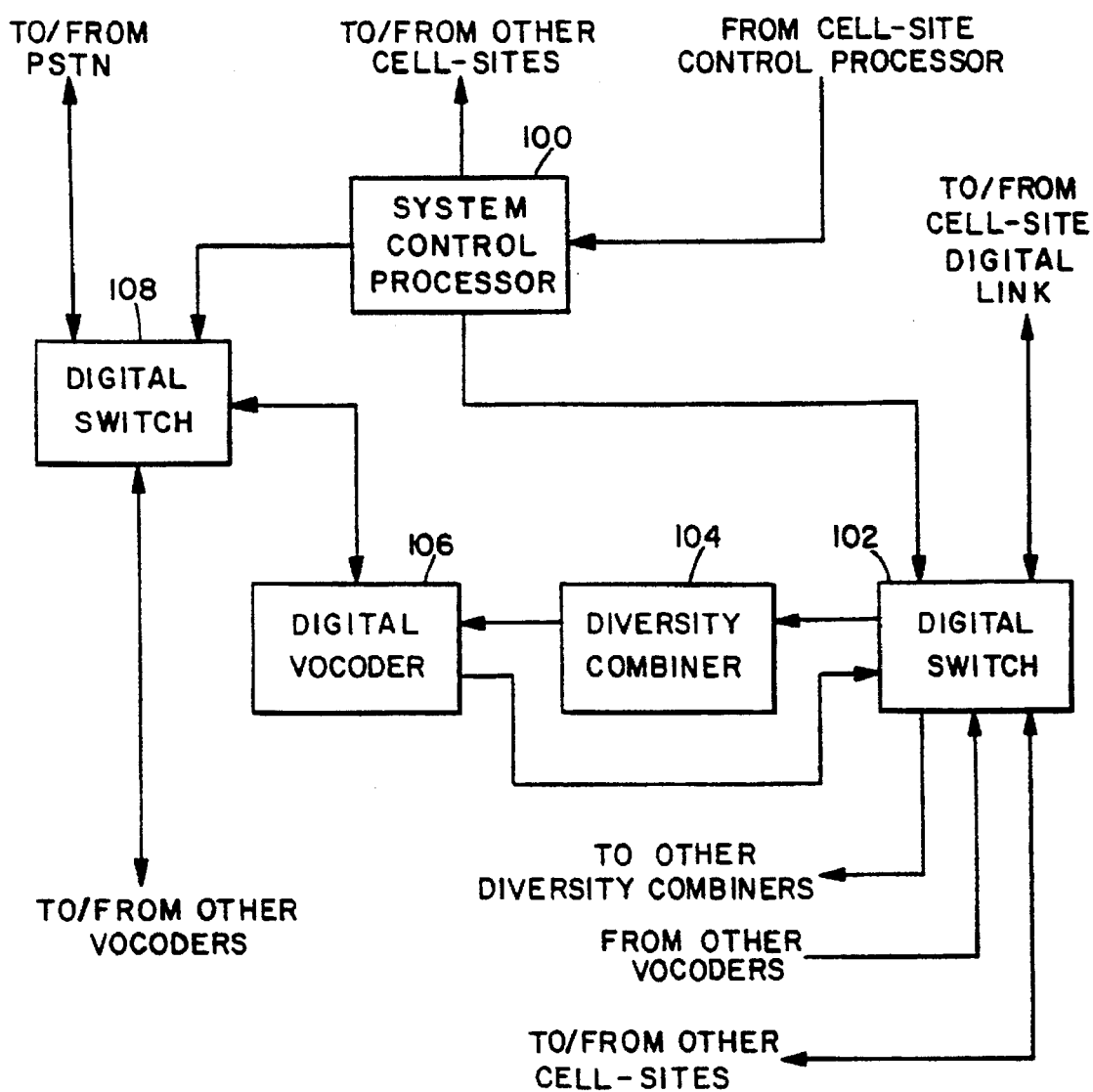
FIG. 4 is a block diagram of a mobile telephone switching office equipment.

FIG. 4 illustrates in block diagram form the equipment utilized in the MTSO. The MTSO typically includes a system controller or system control processor 100, digital switch 102, diversity combiner 104, digital vocoder 106 and digital switch 108. Although not illustrated, additional diversity combiners and digital vocoders are coupled between digital switches 102 and 108.

When the cell-diversity mode is active, or the MTSO is in the handoff process with the call processed by two or more base stations, signals will arrive at the MTSO from more than one base station with nominally the same information. However, because of fading and interference on the inbound link from the mobile station to the base stations, the signal from one base station may be of better quality than the signal from the other base station.

Digital switch 102 is used in routing the information stream corresponding to a given mobile station from one or more base stations to diversity combiner 104 or the corresponding diversity combiner as determined by a signal from system control processor 100. When the system is not in the cell-diversity mode, diversity combiner 104 may be either bypassed or fed the same information on each input port.

A multiplicity of serial coupled diversity combiners (or selectors) and vocoders are provided in parallel, nominally, one for each call to be processed. Diversity combiner 104 compares the signal quality indicators accompanying the information bits from the two or more base station signals. Diversity combiner 104 selects the bits corresponding to the highest quality base station signal on a frame-by-frame basis of the information for output to vocoder 106.

Vocoder 106 converts the format of the digitized voice signal to standard 64 Kbps PCN telephone format, analog, or any other standard format. The resultant signals are transmitted from vocoder 106 to digital switch 108. Under the control of system control processor 100, the call is routed to the FSTN.

Voice signals coming from the PSTN intended for the mobile station are provided to digital switch 108 to an appropriate digital vocoder such as vocoder 106 under control of system control processor 100. Vocoder 106 encodes the input digitized voice signals and provides the resulting information bit stream directly to digital switch 102. Digital switch 102 under system control processor control directs the encoded data to the base station or base stations to which the mobile station is communicating. If the mobile station is in a handoff mode communicating to multiple base stations or in a cell diversity mode, digital switch 102 routes the calls to the appropriate base stations for transmission by the appropriate base station transmitter to the intended recipient mobile station. However, if the mobile station is communicating with only a single base station or not in a cell diversity mode, the signal is directed only to a single base station.

System control processor 100 provides control over digital switches 102 and 108 for routing data to and from the MTSO. System control processor 100 also determines the assignment of calls to the base stations and to the vocoders at the MTSO. Furthermore, system control processor 100 communicates with each base station control processor about the assignment of particular calls between the MTSO and base station, and the assignment of PN codes for the calls. It should be further understood that as illustrated in FIG. 4 digital switches 102 and 108 are illustrated as two separate switches, however, this function may be performed by a single physical switching station.

It should also be understood the embodiment provided herein with respect to the system architecture is merely and exemplary embodiment of the system and that other system architecture may be employed. For example, as described herein the system controller is located at the MTSO for control of many of the base station functions and handoff function. In an equally preferred mode, many of the functions of the system controller may be distributed throughout the base station. In this example the system controller functions remaining at the MTSO would be primarily directed to the classical MTSO function of call switching control.

Turning now to an exemplary processing of the handoff or diversity mode operation various messages are provided between the base station and the mobile station. Generally decisions regarding handoff are made by system control processor with the base station acting on these decisions in addition to relaying them on to the mobile station.

The system control processor generates various messages for relay by the base station to the mobile station. One such message is the System Parameters Message, communicated on a paging channel by the base station, which contains default values for various handoff parameters. The parameters included in this message are as follows and whose usage is defined later herein: Handoff Detection Threshold (T_ADD$_s$); Handoff Drop Threshold (T_DROP$_s$), Active/Candidate Comparison Threshold (T_COMP$_s$), Handoff Drop Timer (T_TDROP$_s$), Neighbor Set Maximum Age (NGHBR_MAX_AGE$_s$); Search Window Size for the Active Set and candidate Set (SRCH_WIN_A$_s$); Search Window Size for the Neighbor Set (SRCH_WIN_N$_s$); Search Window Size for the Remaining Set (SRCH_WIN_R$_s$). These values are demodulated and decoded, and then stored in the mobile station control processor.

Other messages generated by system control processor and communicated via at least one base station to the mobile station are the Pilot Measurement Request Order, the Handoff Direction Message, the In-Traffic System Parameters Message, and the Neighbor List Update Message. These messages are demodulated and decoded, and then provided to the mobile station control processor. The mobile station acts upon the each of these messages in support of a handoff as discussed below.

In response to the Pilot Measurement Request Order the mobile station reports the current estimate of the pilot strengths of all the pilots in its Active Set and Candidate Set. In a preferred implementation the mobile station responds with a Pilot Strength Measurement Report Message within 200 ms. The mobile station control processor upon receiving the Pilot Measurement Request Order the mobile station reports the estimate of the signal strength of each pilot in the Active Set and the Candidate Set.

The Handoff Direction Message as communicated to the mobile station identifies the pilots in the Active Set of the mobile station, i.e. pilot offsets and corresponding base station identifications, and the channel code assigned to the mobile station in each base station. The mobile station, which stores the sets in its control processor, modifies its Active Set of pilots to be equal to the list of pilots received in the Handoff Direction Message. If the Handoff Direction Message specifies multiple base stations, the mobile station is to accordingly begin diversity combining the traffic channel signals from those base stations identified in the message. The mobile station under control of the mobile station control processor discontinues using communications of all base station not specified in the Handoff Direction Message. It should be noted that the Handoff Direction Message is also used to end a soft handoff. In this case, the Handoff Direction Message specifies only one pilot for the Active Set.

The In-Traffic System Parameters Message as communicated to the mobile station is used by the mobile station to update the above mentioned stored handoff overhead parameters of the System Parameters Message. The parameters to be replaced are as follows where the Handoff Detection Threshold (T_ADD$_r$ replaces T_ADD$_s$); Handoff Drop Threshold (T_DROP$_r$ replaces T_DROP$_s$); Active/Candidate Comparison Threshold (T_COMP$_r$ replaces T_COMP$_s$); Handoff Drop Timer (T_TDROP$_r$ replaces T_TDROP$_s$); Neighbor Set Maximum Age (NGHBR_MAX_AGE$_r$ replaces NGHBR_MAX_AGE$_s$); Search Window Size for the Active Set and Candidate Set (SRCH_WIN_A$_r$ replaces SRCH_WIN_A$_s$); Search Window Size for the Neighbor Set (SRCH_WIN_N$_r$ replaces SRCH_WIN_N$_s$); Search Window Size for the Remaining Set (SRCH_WIN_R$_r$ replaces SRCH_WIN_R$_s$). The h-Traffic System Parameters Message is communicated to the mobile station on a traffic channel since the mobile station is unable to receive paging channel messages when receiving data on the traffic channel.

The Neighbor List Update Messages communicated to the mobile station is used by the mobile station such that for each of the Neighbor records received in the Neighbor List Update Message, the mobile station adds that Neighbor to the Neighbor Set as stored in the mobile station control processor.

The mobile station also sends messages on a traffic channel to the base station(s) to support of handoff. The mobile station as mentioned previously generates and sends the Pilot Strength Measurement Report Message as a result of receiving a Pilot Measurement Request Order from the base station. However, more importantly is the fact that the mobile station generates and transmits the Pilot Strength Measurement Report Message autonomously. This independent action on the part of the mobile station as discussed in further detail below, greatly enhances the ability of the system to provide handoffs and diversity in communication. The pilots contained within the Pilot Strength Measurement Report Message are preferably all the pilots in the Active Set and the Candidate Set.

The Pilot Strength Measurement Report Message contains a list of pilots and their measured strengths. The first pilot in the list is the pilot used to derive the time reference of the mobile station. In a preferred embodiment the earliest arriving multipath component that is demodulated is used as the time reference for the mobile station. The mobile station measures the phase of the reported pilot relative to the zero offset pilot PN sequence using timing derived from the pilot used as the time reference. With each reported pilot the mobile station returns the value PILOT_PN_PHASE where this value is defined according to Equation (1).

$$\text{PILOT\_PN\_PHASEj} = [64 \times \text{PILOT\_PN}j + \tau_j - \tau_i] \text{modulo } 2^{15}. \quad (1)$$

where PILOT_PN_PHASEj is the phase of the pilot of base station j; and $\tau_i$ and $\tau_j$ respectively denote the one-way delays in PN chips from the respective base stations to the mobile station.

Figure 5:
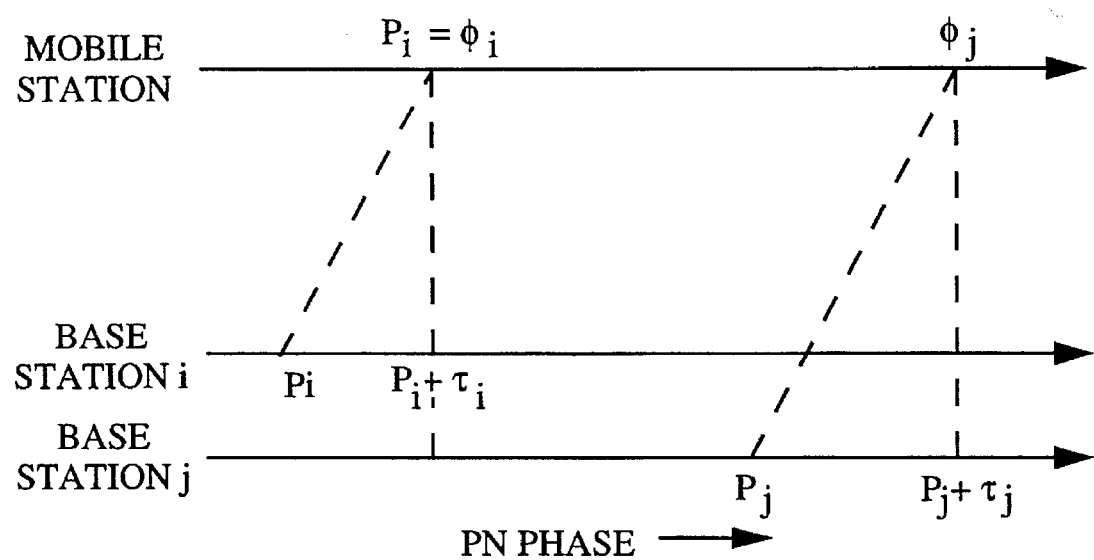
FIG. 5 is a timing diagram illustrating the determination of pilot PN phase.

The concept of time reference and calculation of PN phase offsets for pilots from other base stations is illustrated in FIG. 5. It should be noted that timing in the mobile station is offset from timing in the base stations by $\tau_i$ chips. The required pilot PN phase, $\phi_j$, is obtained from FIG. 5 by observing that:

$$\phi_j - \phi_i = P_j + \tau_j - [P_i + \tau_i] \quad (2)$$

with the time reference, $P_i = \phi_i$; and where $$P_i = 64 \times \text{PILOT\_PN}i \text{ and} \quad (3)$$

$$P_j = 64 \times \text{PILOT\_PN}j. \quad (4)$$

While the mobile station is in a traffic channel mode of communication with the base station, under the control of the mobile station control processor the searcher receiver systematically surveys the strengths of all pilots in the four pilot sets, on the current CDMA frequency assignment. The results of the survey are provided to the mobile station control processor for further use.

The search rates for members of the Active Set and the Candidate Set are preferably identical. The search range for all members of the Active Set and the Candidate Set is specified by the System Parameters Message and the In-Traffic System Parameters Message as the variable SRCH_WIN_A. The actual window values the mobile station preferably should use as a function of SRCH_WIN_A are defined in Table I. For each member of the Active Set and the Candidate Set, the search window is centered around the earliest arriving usable multipath component. A multipath component is termed usable if it is of sufficient strength so that the mobile station would use it to demodulate data. It should be noted that a usable multipath component may actually not be used for demodulation as it is not in the Active set or there are insufficient numbers of demodulators (receivers) available. If the mobile station performs any filtering on search results, it is preferred that the same filter parameters for Active Set and Candidate Set members be used.

TABLE I

| Parameter | Actual Range (chips) | Parameter | Actual Range (chips) |
|---|---|---|---|
| 0 | 2 | 8 | 40 |
| 1 | 4 | 9 | 56 |
| 2 | 6 | 10 | 80 |
| 3 | 8 | 11 | 114 |
| 4 | 10 | 12 | 160 |
| 5 | 14 | 13 | 226 |
| 6 | 20 | 14 | 320 |
| 7 | 28 | 15 | 452 |

The search range for all members of the Neighbor Set is also specified by the System Parameters Message and the In-Traffic System Parameters Message as the variable SRCH_WIN_N. The actual window values the mobile station should use as a function of SRCH_WIN_N, are also defined in Table I. The search window is centered around the pilot PN sequence offset of each member of the Neighbor Set using timing defined by the mobile station time reference.

The search range for all members of the Remaining Set is also specified by the System Parameters Message and the In-Traffic System Parameters Message as the variable SRCH_WIN_R. The actual window values the mobile station should use as a function of SRCH_WIN_R are also defined in Table I. The search window is again centered around the pilot PN sequence offset of each member of the Remaining Set using timing defined by the mobile station time reference.

The mobile station under the control of the mobile station control processor autonomously generates and sends a Pilot Strength Measurement Report Message to a base station whenever any of several events occur as a result of the survey.

(1) The strength of a Candidate Set, Neighbor Set, or Remaining Set member is found to be above T_ADD (the pilot is added to the Candidate Set) and a Pilot Strength Measurement Report Message carrying this information has not been generated since the last Handoff Direction Message was received. In the case where the measured pilot is not currently a member of the Candidate Set, the pilot is so added to the Candidate Set.

(2) The strength of a Candidate Set member exceeds the strength of an Active Set member by T_COMP dB and a Pilot Strength Measurement Report Message carrying this information has not been generated since the last Handoff Direction Message was received.

(3) The strength of an Active Set member has been less than T_DROP for a period of T_TDROP seconds. The parameter T_TDROP is given as a 4-bit value defining one of 16 timer values. The mobile station control processor keeps track of the time which Active Set pilots drop below the T_DROP value. The value that the mobile station uses is preferably within the greater of ±100 msec. or ten percent of the values given in Table II as follows.

TABLE II

| T_TDROP | Actual Value (seconds) | T_TDROP | Actual Value (seconds) |
|---|---|---|---|
| 0 | 0 | 8 | 10 |
| 1 | 0.5 | 9 | 13 |
| 2 | 1 | 10 | 16 |
| 3 | 2 | 11 | 20 |
| 4 | 3 | 12 | 25 |
| 5 | 4 | 13 | 30 |
| 6 | 5 | 14 | 45 |
| 7 | 8 | 15 | 60 |

Figure 6:
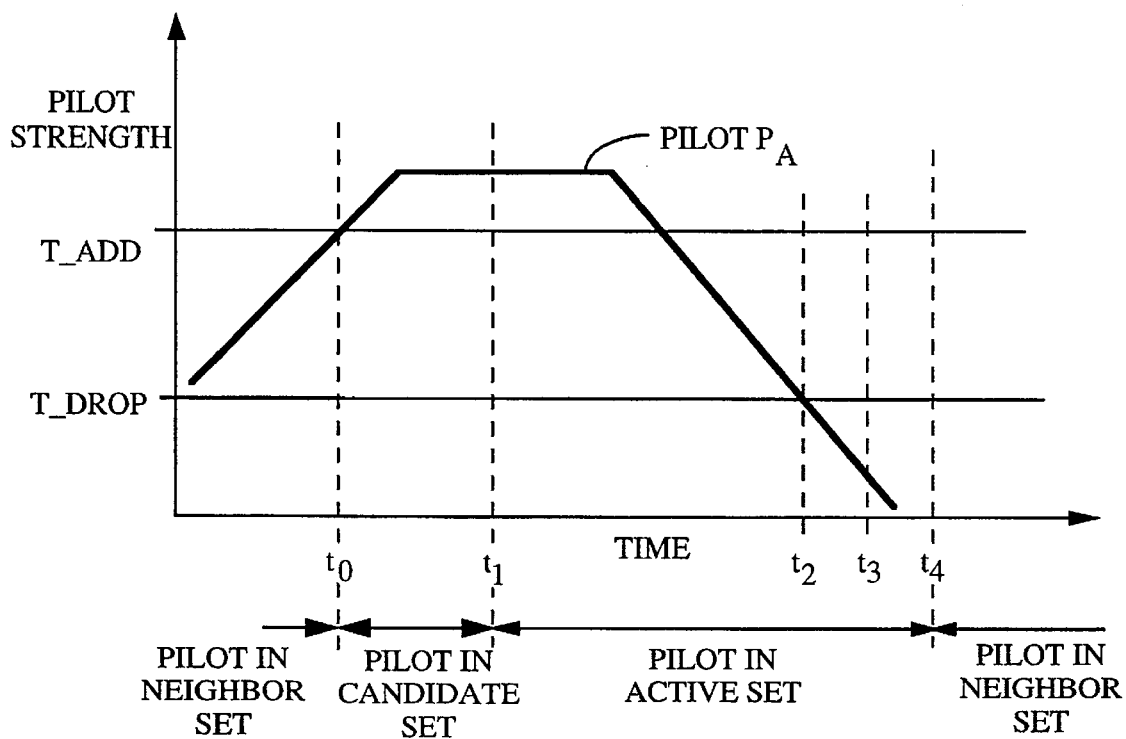
FIG. 6 is a diagram illustrating the various events occurring as a pilot signal rises and falls in signal strength.

FIG. 6 illustrates an example of the signaling pertaining to the changes in a pilot's strength and the pilot's membership in the various sets during a typical handoff process. In FIG. 6, prior to time $t_0$ the pilot $P_A$ is in the Neighbor Set with a rising signal strength as measured by the mobile station searcher receiver. However the pilot signal strength is below the threshold T_ADD which would qualify the pilot to enter the Candidate Set. The mobile station control processor makes a decision to place an non-Active or non-Candidate Set member in the Candidate Set when the measured pilot exceeds the threshold value T_ADD, an event to which the mobile station control processor generates and transmits a Pilot Strength Measurement Report Message.

At time $t_0$ the pilot $P_A$ signal strength as measured by the searcher receiver exceeds the value T_ADD. The mobile station control processor compares the measured value with the T_ADD value and determines that the T_ADD value has been exceeded. The mobile station control processor thus generates and transmits a corresponding Pilot Strength Measurement Report Message.

It should be noted that the searcher may detect several multipath versions of pilot $P_A$ which may be different from one another by the order of several chips. The strongest version of the multipath versions or an average of the strength of all detected multipath versions of the pilot may be used for identifying the strength of the pilot. Either the searcher or the mobile station control processor may compute the average if so desired.

The decision for placing a Candidate Set member into the Active Set is made by the system controller. For example, when the measured Candidate pilot is of a signal strength which exceeds the signal strength of one other Active Set member pilot by a predetermined value it may join the Active Set. However there may be limits placed on the number of Active Set members. Should the addition of a pilot to the Active Set exceed the Active Set limit, the weakest Active Set pilot may be removed to another set.

Once a decision is made by the system controller that a pilot should enter the Active Set, a Handoff Direction Message is sent to the mobile station, all base stations that have a traffic channel assigned to the mobile station, which includes the pilot $P_A$ in the Active Set. In FIG. 6 at time $t$, the Handoff Direction Message is received at the mobile station where the identified pilots, including pilot $P_A$, are used to demodulate received signals from the base station from which pilot $P_A$ was transmitted and/or from another base station. Once a pilot is identified in the Handoff Direction Message, one version or multipath versions of the information signals if present corresponding to the identified pilot from the same base station may be demodulated. The signals ultimately demodulated may therefore be transmitted from one or more base station and may be multipath versions thereof. During the soft handoff the mobile station diversity combines at the received signals at the symbol level. Therefore, all base stations participating in the soft handoff must transmit identical symbols, except for closed loop power control sub channel data as discussed later herein.

In FIG. 6 between the times $t_1$ and $t_2$ the pilot $P_A$ falls in signal strength to where at time $t_2$ the signal strength drops below a predetermined threshold value T_DROP. When the signal strength of a pilot drops the value T_DROP for a predetermined period of time, the mobile station control processor again generates and transmits, at time $t_3$, a Pilot Strength Measurement Report Message.

In response to this Pilot Strength Measurement Report Message, the system controller generates a Handoff Direction Message that is sent to the mobile station, by all base stations having a traffic channel assigned to the mobile station, which no longer includes the pilot $P_A$ in the Active Set. At time $t_4$ the Handoff Direction Message is received at the mobile station for removing the pilot $P_A$ from the Active Set, for example to the Neighbor Set. Once removed from the Active Set this pilot is no longer used for signal demodulation.

Figure 7:
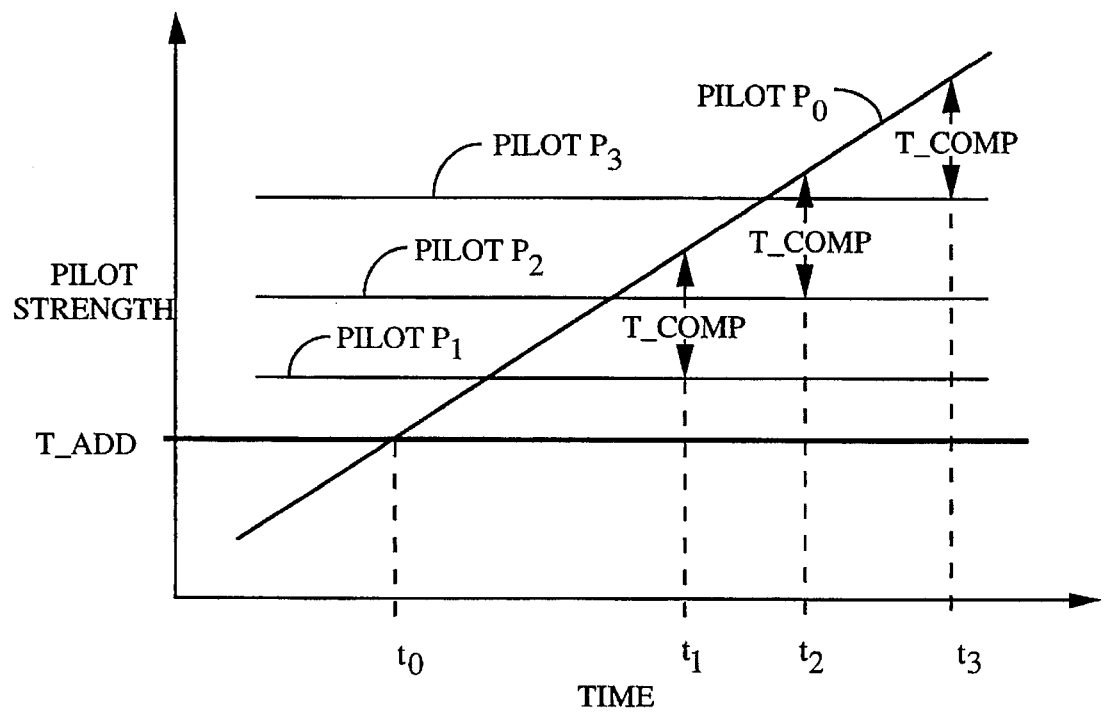
FIG. 7 is a diagram illustrating the events as a pilot signal rises in signal strength above Active Set pilot signal.

FIG. 7 illustrates the signaling triggered by a member of the Candidate Set as its strength rises above members of the Active Set. It should be noted that the mobile station reports that a Candidate Set member is greater than an Active Set member only if the difference between them is at least T_COMP dB. In FIG. 7, pilots $P_1$, $P_2$ and $P_3$ are members of the Active Set while pilot $P_0$ is initially a member of another set such as the Neighbor Set.

Generally the number of Active Set members correspond to the number of data receivers available, however the Active Set may be of a greater number of pilots. The mobile station is therefore permitted to select from the Active Set member pilots those of greatest signal strength for demodulation of the corresponding data signals. It should be understood that one or more pilots of the Active sets may have multipath propagations of the same base station or sector transmitted pilot as received at the mobile station. In the case of multipath propagations, the mobile station again selects signals for demodulation corresponding to those multipath versions of the pilots identified in the Active Set pilots of greatest signal strength. Therefore the actual base station signals demodulated by the mobile station may be from different base stations or from a same base station.

At time $t_0$ the pilot $P_0$ as measured by the searcher receiver and compared with the value T_ADD by the mobile station control processor is determined to be greater than the value T_ADD. As discussed above, this event results in the mobile station control processor generating a Pilot Strength Measurement Report Message which is transmitted by the mobile station to a base station for relay to the system control processor. The mobile station also adds the pilot $P_0$ to the Candidate Set.

As time continues on the pilot $P_0$ grows stronger. At time $t_1$ the pilot $P_0$ has grown stronger than pilot $P_1$ by a value greater than the value T_COMP. Due to this fact the mobile station control processor generates another Pilot Strength Measurement Report Message which is transmitted by the mobile station to a base station for relay to the system control processor. It should be noted that only pilots that are already members of the Candidate Set are compared to Active Set members using the T_COMP criteria. Since the pilot $P_0$ has exceed the pilot $P_1$ by the value T_COMP, the system controller may begin setting up a modem at another base station or sector for communicating with the mobile station. However if the pilot is not of another base station or sector no setup is necessary. In either case the system controller would then communicate a Handoff Direction Message to the mobile station including the pilot if not already an Active Set member.

Similar is the procedure as pilot $P_0$ grows stronger. At time $t_2$ the pilot $P_0$ has grown stronger than the next strongest pilot $P_2$ by a value greater than the value T_COMP. Like before, the mobile station control processor generates another Pilot Strength Measurement Report Message which is transmitted by the mobile station to a base station for relay to the system control processor. Since the pilot $P_0$ has exceed the pilot $P_2$ by the value T_COMP, the system controller may add the pilot to the Active Set as discussed above if not yet already done. Similar is the procedure at time $t_3$ where pilot $P_0$ has grown stronger than the strongest pilot $P_3$ by a value greater than the value T_COMP.

Each reported pilot strength shall be as a value LEVEL according to Equation (3) as follows:

$$\text{LEVEL} = [-2 \times 10 \times \log_{10} E_c/I_0], \quad (5)$$

where [ x ] is the largest integer less than or equal to x; and $E_c/I_0$ is the ratio of received pilot energy per chip to received overall spectral density.

The value returned in the Pilot Strength Measurement Report Message is therefore preferably a 6-bit, unsigned, fixed-point number. Out-of-range values preferably limited to the bounding values of 0 and 63 ('111111').

The mobile station control processor is responsible for maintenance of the sets. With respect to the Active Set, it is preferable that the mobile station be capable of supporting an Active Set size of at least six pilots. A pilot is added to the Active Set if it appears in a Handoff Direction Message received from the base station. A pilot is deleted from the Active Set if it is a member of the Active Set and a Handoff Direction Message is received from the base station in which it does not appear.

It is also preferred that the mobile station be capable of supporting a Candidate Set size of at least six pilots. A pilot is added to the Candidate Set whenever (1) the strength of a Neighbor Set member is determined to be above T_ADD; (2) the strength of a Remaining Set member is determined to be above T_ADD; or (3) a Handoff Direction Message is received removing an Active Set member and that pilot's strength has not been less than T_DROP for a period of T_TDROP seconds.

Pilots are deleted from the Candidate Set whenever (1) a Handoff Direction Message is received adding a Candidate Set member to the Active Set; (2) the strength of a Candidate Set member is determined to be less than T_DROP for a period of T_TDROP seconds, in which case the pilot is moved to the Neighbor Set; or (3) an attempt to move a pilot into the Candidate Set is made when there are already six pilots (or more if desired) in the Candidate Set. In case of a Candidate Set overflow, i.e. case (3), the mobile station shall move to the Neighbor Set the member whose timer is closest to expiration, or if all members are greater than T_DROP, a member that has minimum strength.

It is also preferred that the mobile station be capable of supporting a Neighbor Set size of at least 20 pilots. The mobile station preferably maintains an aging mechanism for members of the Neighbor Set. The purpose of the aging mechanism is to allow the mobile station to maintain in its Neighbor Set those pilots that have been strong recently and thus are likely candidates for handoff. With each pilot in the Neighbor Set, the mobile station shall associate an age variable, herein denoted by AGE. The AGE of a pilot shall be initialized upon insertion in the Neighbor Set and shall be incremented upon receipt of a Neighbor List Update Message as described below.

When the mobile station is first assigned a forward traffic channel, the Neighbor Set is comprised of the pilots specified in the most recently received Neighbor List Message. The AGE of each pilot shall be initialized to the value NGHBR_MAX_AGE.

Pilots are added to the Neighbor Set whenever (1) a Neighbor List Update Message is received, each pilot named in the Neighbor List Update Message is added to the Neighbor Set, if it is not already a member of the Candidate Set or Active Set, with the AGE of each of these pilots set to NGHBR_MAX_AGE; (2) when the pilot survey detects a pilot in the Candidate Set whose strength has been below T_DROP for a period of T_TDROP seconds, that pilot is added to the Neighbor Set with its AGE set to zero; (3) when an Active Set member is removed from the Active Set by a Handoff Direction Message, it is added to the Neighbor Set, if its energy has been below T_DROP for a period of T_TDROP seconds, with its AGE set to zero; or (4) when a Candidate Set member has been moved to the Neighbor Set due to Candidate Set overflow, AGE =0.

A pilot is deleted from the Neighbor Set whenever (1) the strength of the pilot is determined to be above T_ADD with the pilot being moved to the Candidate Set; (2) a Handoff Direction Message is received placing the pilot in the Active Set; (3) the AGE of the pilot is incremented above NGHBR_MAX_AGE with the pilot being moved to the Remaining Set; or (4) an attempt to move a pilot into the Neighbor Set is made when there are already 20 pilots (or more if desired)in the Neighbor Set. In case (4) the mobile station moves to the Remaining Set the pilot whose AGE is maximum. If more than one such pilot exists, the mobile station moves to the Remaining Set a pilot whose signal strength is minimum.

Table III as set forth below summarizes the events moving pilots between the different sets.

TABLE III

| Origin Set | Destination Set | Event |
|---|---|---|
| Active | Candidate | Handoff Direction Message not including the pilot and the T_TDROP timer has not expired |
| Active | Neighbor | Handoff Direction Message not including the pilot and the T_TDROP timer has expired |
| Active | Remaining | Not used |
| Candidate | Active | Handoff Direction Message including the pilot |
| Candidate | Neighbor | T_TDROP timer has expired |
| Candidate | Remaining | Not used |
| Neighbor | Active | Handoff Direction Message including the pilot |
| Neighbor | Candidate | Pilot strength is greater than T_ADD |
| Neighbor | Remaining | AGE is greater than NGHBR_MAX_AGE |
| Remaining | Active | Handoff Direction Message including the pilot |
| Remaining | Candidate | Pilot strength is greater than T_ADD |
| Remaining | Neighbor | Neighbor List Update Message including the pilot |

It should be noted that in Table III for the transition from Active to Remaining Set and the transition from Candidate to remaining Set are listed as not used. However it should be understood that a pilot may be moved from the Active Set to the Remaining Set if the base station sets the NGHBR_MAX_AGE to zero and the Neighbor Set already contains the maximum number of pilots, 20 pilots for this example.

Similarly, a pilot may be moved from the Candidate Set to the Remaining Set if the base station sets the NGHBR_MAX_AGE to zero and the Neighbor Set already contains the maximum number of pilots, 20 pilots again for this example.

With respect to the mobile station a soft handoff begins, or a cell diversity mode is entered, when the base station sends a Handoff Direction Message which includes more than one pilot. As discussed previously the purpose of a soft handoff is to provide diversity in communication of signals between the mobile station and the base stations on the boundaries between base stations. In addition, soft handoff provides uninterrupted transmission between the mobile station and the base station in transitions between base station coverage areas. Using the techniques discussed above, an example of call processing during a soft handoff from one base station to another is shown in FIG. 8.

Figure 8:
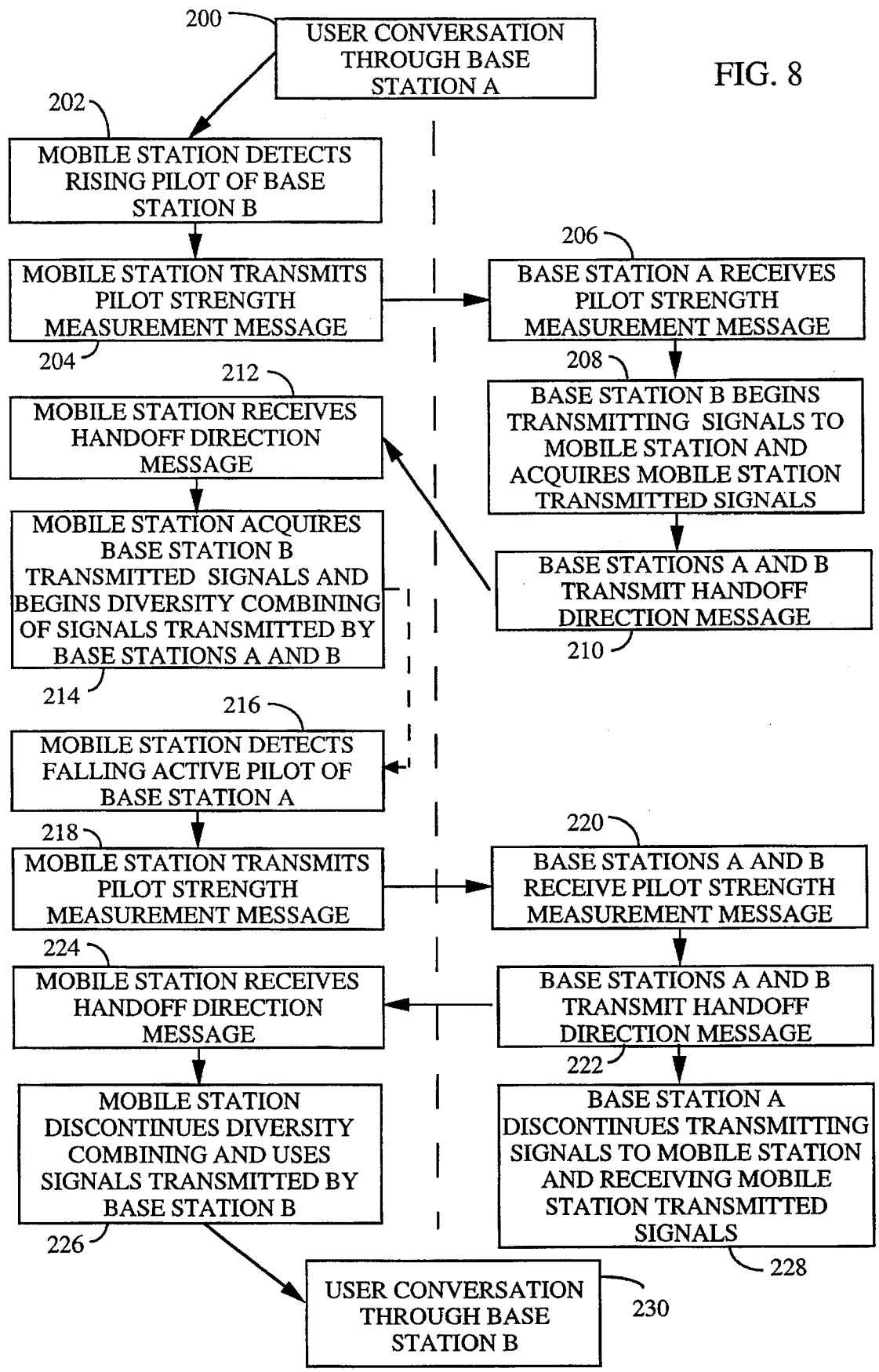
FIG. 8 is a flow diagram of the call processing for a soft handoff in communications from one base station to another.

In FIG. 8, the blocks illustrated on the left hand side of the dashed line relate to the actions of a mobile station while the blocks on the right hand side of the dashed line indicate the actions of base stations A and B. At the time a handoff is to begin the mobile station is communicating with another user via base station A and the MTSO, block 200.

As the mobile station approaches the boundary of the cell serviced by base station A its searcher receiver detects an increase in the pilot signal strength of the pilot of neighboring base station B, block 202. When the pilot is determined to increase above the threshold value T_ADD the mobile station generates and transmits a pilot strength measurement message, block 204. Base station A which is currently in communication with the mobile station receives the Pilot Strength Measurement Report Message and relays it on to the MTSO. At the MTSO the system controller determines that the pilot of base station B should be entered into the Active Set of the mobile station. The MTSO communicates with base station B relevant setup information relative to the mobile station to establish communications with the mobile station. Base station B in response to this information begins transmitting user signals, provided via the MTSO, to the mobile station using the assigned PN codes in addition to acquiring signals received from the mobile station, block 208.

The MTSO also sends a Handoff Direction Message to both of base stations A and B for transmission to the mobile station. The Handoff Direction Message indicates to the mobile station that the pilots of base station A and base station B are to be entered into the mobile station Active Set, block 210. The mobile station receives the Handoff Direction Message, block 212, and enters the pilots of base stations A and B into its Active Set. The mobile station in response to this Handoff Direction Message begins to acquire the communications signals transmitted by base station B with diversity combining of the signals of base stations B and A, block 214. The mobile station is thus communicating with the other user through both of base stations A and B.

The mobile unit continues travelling through the system, such as by leaving the coverage area of base station A and entering the coverage area of base station B. As the mobile station travels further into the coverage area of base station B the mobile station searcher receiver measures a signal strength of the Active pilot of base station A which has fallen, block 216. As discussed previously, when the pilot of base station A drops below the threshold T_DROP for a period of time determined by the parameter T_TDROP, the mobile station generates and transmits a corresponding Pilot Strength Measurement Report Message to both bases stations A and B, block 218. One or both of base stations A and B should receive the Pilot Strength Measurement Report Message and transfer it on to the MTSO, block 220.

The MTSO in response to the Pilot Strength Measurement Report Message makes a decision that the pilot of base station A is to be removed from the mobile station Active list so as to terminate communications through base station A. Accordingly, the MTSO generates a Handoff Direction Message that is communicated to both of base stations A and B. This Handoff Direction Message identifies only the pilot of base station B and is transmitted by both of base stations A and B to the mobile station, block 222.

The mobile station receives this Handoff Direction Message, block 224. The mobile station in response removes the base station A pilot from the Active Set and discontinues using signals transmitted from base station A. The mobile station discontinues diversity combining of the signals from base stations A and B and demodulates only the signals received from base station B, block 226.

Contemporaneous with the communication of the Handoff Direction Message to the mobile station, the MTSO also begins tearing down the call communicated through base station A. The MTSO sends messages to base station A, which in response thereto discontinues communications with the mobile station, block 228. Handoff is now complete in that the mobile station which originally communicated with the other user through base station A alone, then through both base stations A and B, now only communicates with the other user through base station B, block 230.

Figure 9:
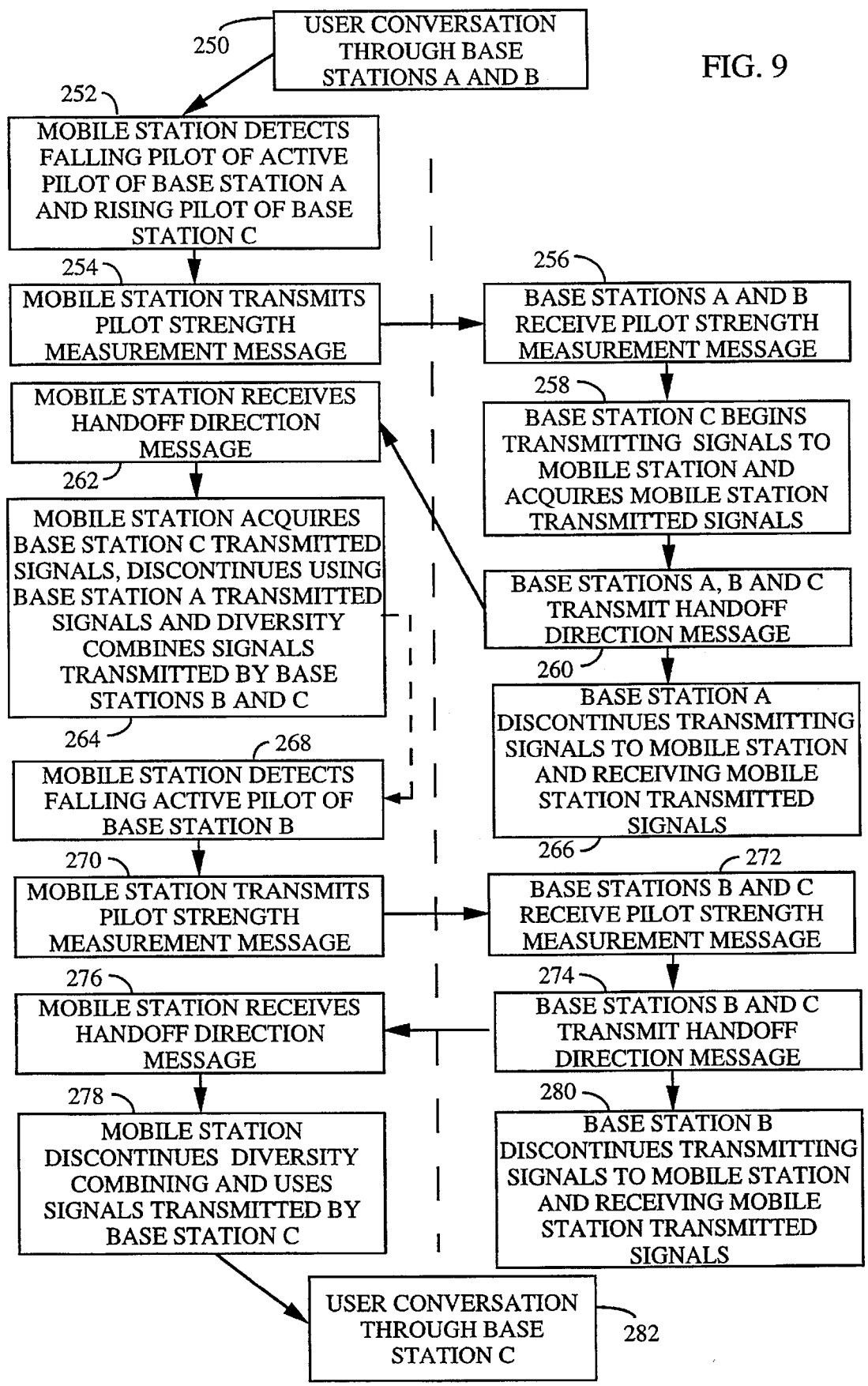
FIG. 9 is a flow diagram of the call processing for a sequential soft handoff in communications between base station.

A mobile station already in soft handoff and already receiving more than one base station signal, may be directed to perform a second soft handoff before the first is complete. That is, one of the base stations participating in the soft handoff may be replaced with another. The mobile station, in this case, replaces the pilot associated with the specified base station in its Active Set and continues in soft handoff with the new base station(s). An example of call processing during sequential soft handoff is shown in FIG. 9. A sequential soft handoff may occur as shown in FIG. 9 where a mobile station travels along the boundary of multiple base stations.

In FIG. 9 a soft handoff is in process wherein the user conversation is between a mobile station and another user via base stations A and B and the MTSO, block 250. The mobile station may for example be closest to the boundary of cells serviced by base stations A and B while travelling towards a boundary of a cell serviced by base station C. The mobile station detects a falling in signal strength of Active pilot A while also detecting a rise in signal strength of a non-Active Set pilot, pilot C, block 252. With the Active pilot A falling below the level T_DROP for the predetermined period of time along with the rising of pilot C above the threshold $T_1$-ADD, a pilot strength measurement message is generated and transmitted, to base stations A and B, block 254. Base stations A and B receive the pilot strength measurement message and relay the message on to the MTSO, block 256.

In response to this message the MTSO determines that the Active Set for the mobile should contain only the pilots of base stations B and C and not that of base station A. Accordingly the MTSO sends a set-up message to base station C for it to establish communications with the user. Base station C in response begins transmitting the message signals from the user, provided thereto via the MTSO, in addition to acquiring signals from the mobile station for transfer to the MTSO, block 258.

The MTSO generates the Handoff Direction Message, which identifies only base stations B and C for Active Set members, and communicates this message to base stations A, B and C. Each of base stations A, B and C transmit the Handoff Direction Message to the mobile station, block 260.

The mobile station receives this Handoff Direction Message, block 262. The mobile station in response to the Handoff Direction Message removes the base station A pilot from the Active Set and discontinues demodulation signals transmitted from base station A. The mobile station thus discontinues diversity combining of the signals from base stations A and B. However the mobile station begins to demodulate the signals received from base station C along with those received from base station B and diversity combines with the signals received from base station B and C, block 264.

Contemporaneous with the communication of the Handoff Direction Message to the mobile station, the MTSO also begins tearing down the call communicated through base station A. The MTSO sends messages to base station A, which in response thereto discontinues communications with the mobile station, block 266.

The mobile unit continues travelling through the system, such as by leaving the coverage area of base station B and entering the coverage area of base station C. As the mobile station travels further into the coverage area of base station C the mobile station searcher receiver detects a falling in signal strength of the Active pilot of base station B, block 268. When the pilot of base station B drops below the threshold T_DROP for a predetermined period of time the mobile station generates and transmits a corresponding Pilot Strength Measurement Report Message to both bases stations B and C, block 270. One or both of base stations B and C receive the Pilot Strength Measurement Report Message and transfer it on to the MTSO, block 272.

The MTSO in response to the Pilot Strength Measurement Report Message makes a decision that the pilot of base station B is to be removed from the mobile station Active list so as to terminate communications through base station B. Accordingly, the MTSO generates a Handoff Direction Message that is communicated to both of base stations B and C. This Handoff Direction Message identifies only the pilot of base station C and is transmitted by both of base stations B and C to the mobile station, block 274.

The mobile station receives this Handoff Direction Message, block 276. The mobile station in response removes the base station B pilot from the Active Set and discontinues using signals transmitted from base station B. The mobile station discontinues diversity combining of the signals from base stations B and C and demodulates only the signals received from base station C, block 278.

Contemporaneous with the communication of the Handoff Direction Message to mobile station, the MTSO also begins tearing down the call communicated through base station B. The MTSO sends messages to base station B, which in response thereto discontinues communications with the mobile station, block 280. The sequential soft handoff is now complete in that the mobile station which originally communicated with the other user through base stations A and B, then through base stations B and C, now only communicates with the other user through base station C, block 282.

All base stations participating in a soft handoff transmit identical modulation symbols, with the exception of the closed loop power control signals as mentioned in the U.S. Pat. No. 5,056,109, on the communication channel dedicated to the mobile station. The mobile station is capable of providing diversity combining of these signals from the various base stations. In diversity combining, the mobile station should provide for differential path delays of up to at least 150 μsec.

It should be noted that mobile station transmission power control is continued during a soft handoff. For example, the power control bits transmitted from each base station are received and demodulated by the mobile station and are used in the control of the mobile station transmitter power. The Handoff Direction Message preferably identifies base stations transmission by groups by indicating which base station transmissions carry identical power control bits. The mobile station then may provide diversity combining of power control bits within each group. The mobile station may then obtain one power control decision bit from each group. If all resulting bits request an increase, i.e., are equal to '0', the mobile station increases its transmitter power, and if any one of these bits indicates a decreases, i.e., is equal to '1', the mobile station decrease its transmitter power.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

We claim:

1. In a cellular communication system in which a mobile user communicates with other users via at least one base station, wherein each of a plurality of base stations within said system transmits a unique pilot signal, a mobile station transceiver comprising:

a pilot signal strength measurement circuit for measuring strength of base station transmitted pilot signals and for generating a first signal strength message when one or more of said measured pilot signals, from base stations not currently in communication with said mobile station transceiver, exceed a first predetermined level;

a mobile station transmitter for transmitting said first signal strength message to at least one of said base stations with which said mobile user is currently in communication; and a mobile station receiver for receiving a first direction signal from at least one of said base stations with which said mobile user is currently in communication;

wherein in response to said first received direction signal communication is established between said mobile station transceiver and at least one of said base stations from which were received said measured pilot signals exceeding said first predetermined level.

2. The mobile station transceiver of claim 1 wherein said pilot signal strength measurement circuit includes means for generating a second signal strength message when one or more of said measured pilot signals, from at least one of said base stations currently in communication with said mobile station transceiver, fall below a second predetermined level.

3. The mobile station transceiver of claim 2 wherein said mobile station transmitter operates to transmit said second signal strength message to at least one of said base stations currently in communication with said mobile station transceiver, and wherein said mobile station receiver includes means for receiving a second direction signal from at least one of said base stations with which said mobile unit transceiver is currently in communication, said mobile station transceiver including a controller for terminating communication, in response to said second received direction signal, with at least one of said base stations from which were received said measured pilot signals below said second predetermined level.

4. In a cellular communication system in which a mobile user communicates through a mobile station transceiver with other users via at least one base station, wherein each base station in said system transmits a unique pilot signal and wherein each base station is in communication with a system controller, said mobile station transceiver comprising:

a pilot signal strength measurement circuit for measuring signal strength of base station transmitted pilot signals from base stations included in a first list identifying a first set of said base stations;

a comparator for comparing said measured pilot signal strengths to a first predetermined level;

means for generating a second list identifying a second set of base stations by including within said second list those of said base stations on said first list for which said measured pilot signal strengths exceeded said first predetermined level;

a mobile station transmitter for transmitting said second list to at least a first of said base stations with which said mobile station transceiver is currently in communication;

a mobile station receiver for receiving, from at least one of said base stations with which said mobile unit transceiver is currently in communication, a third list identifying a third set of base stations available for communication with said mobile station transceiver, said third list being generated by said system controller in accordance with said second list of base stations and on the basis of base station availability information; and a mobile station controller for directing said mobile station transceiver to establish communication with said third set of base stations.

5. The mobile station transceiver of claim 4 wherein said pilot signal strength measurement circuit operates to measure signal strength of pilot signals transmitted by each base station of said second and third sets of base stations, and wherein said mobile station transmitter includes means for transmitting a particular base station listing of said second list to at least one of said base stations with which said mobile station transceiver is currently in communication, wherein a pilot signal strength measurement of a particular base station corresponding to said particular base station listing exceeds by a predetermined amount a pilot signal strength measurement of a base station corresponding to a base station listing of said third list.

6. The mobile station transceiver of claim 5 wherein said mobile station receiver further comprises:

means for receiving, from at least one of said base stations with which said mobile station transceiver is currently in communication, an updated third list comprising said particular base station listing, said updated third list being generated by said system controller on the basis of availability of resources at said particular base station;

means for removing said particular base station listing from said second list; and means for establishing communication with said particular base station.

7. The mobile station transceiver of claim 4 further comprising:

means for generating a fourth list identifying a fourth set of base stations, said fourth list identifying all base stations unlisted in said first, second, or third lists, said pilot signal strength measurement circuit being operative to measure signal strength of said pilot signals transmitted by each base station of said fourth set of base stations;

means for comparing said signal strength measurements of said fourth set of base stations to said first predetermined level; and means for removing a second particular base station listing from said fourth list and placing said second particular base station listing in said second list if the signal strength measurement of said second particular base station corresponding to said second particular base station listing exceeds said first predetermined level.

8. The mobile station transceiver of claim 7 further comprising:

means for removing, from said first list, each base station listing that has been in said first list for more than a predetermined time interval and for placing each such base station listing from said first list in said fourth list.

9. The mobile station transceiver of claim 4 further comprising:

means for removing, from said second list, each base station listing having a corresponding signal strength measurement less than a second predetermined level for at least a predetermined time interval and for placing each such base station listing from said second list in said first list.

10. The mobile station of claim 7 further comprising:

means for removing, for each base station having a corresponding signal strength measurement less than a second predetermined level for at least a predetermined time interval, if said first list contains more than a predetermined number of base station listings, each corresponding base station listing from said second list and placing each such base station listing in said fourth list.

11. In a cellular telephone system in which a mobile system user and another system user communicate user information signals therebetween via at least one of a plurality of geographically separated cell-sites each defining a respective geographic service area, said cellular telephone system including a system controller for directing communications between system users of said cellular telephone system, a mobile station transceiver utilized by said mobile system user for communicating with said another system user via said at least one of said plurality of cell-sites, said mobile station transceiver comprising:

a mobile station controller for determining, while said mobile system user is in a service area of one cell-site and communicating user information signals with said another system user via said one cell-site, a transition of said mobile system user from said one cell-site service area to a service area of another cell-site, said system controller being operative to generate a handoff request in response to said determination of said transition into said service area of said another cell-site;

a mobile station transmitter for transmitting said handoff request to said one cell-site identifying said another cell-site; and means for concurrently communicating said user information signals between said mobile station transceiver and said one and another cell-sites, said concurrent communication being established by said system controller in accordance with said handoff request.

12. The system of claim 11 wherein each cell-site transmits a pilot signal indicative of said transmitting cell-site, said mobile station transceiver further comprising:

a scanning receiver for receiving said cell-site transmitted pilot signals, measuring signal strength of each received pilot signal, comparing pilot signal strength measurements, and providing a signal strength signal indicative of a received pilot signal of greatest measured signal strength and cell-site of origin; and a processor for receiving said signal strength signal and for, when said signal strength signal indicates when said another cell-site transmitted pilot signal is of a signal strength greater than said one cell-site transmitted pilot signal, generating said handoff request.

13. In a cellular communication system in which a user at a mobile station communicates with another system user via at least one base station, wherein each base station in said system transmits a unique pilot signal, a method for directing communications between said mobile station user and said base stations comprising the steps of:

measuring at said mobile station signal strength of base station transmitted pilot signals and generating a signal strength message when one or more of said measured pilot signals, from base stations not currently in communication with said mobile station, exceed a first predetermined level;

establishing, upon generation of said signal strength message, communication between said mobile station and at least one of the one or more base stations from which were transmitted said one or more measured pilot signals exceeding said first predetermined level.

14. The method of claim 13 further comprising the steps of:

communicating said signal strength message, from said mobile station to at least one base station said mobile station is in communication with; and communicating to said mobile station, via said at least one base station said mobile unit is in communication with, a direction message indicating said mobile station is to establish communications through each of said one or more base stations from which were transmitted said one or more measured pilot signals exceeding said first predetermined level.

15. The method of claim 13 in which said mobile station user communicates with said another system user via said at least one base station using spread spectrum communication signals.

* * * * *